(12) United States Patent
Barbieru et al.

(10) Patent No.: US 8,979,947 B2
(45) Date of Patent: Mar. 17, 2015

(54) METAL FREE ACID DYES, METHODS FOR THE PRODUCTION THEREOF AND THEIR USE

(75) Inventors: Roxana Barbieru, Singapore (SG); Vajiravelu Sivamurugan, Singapore (SG)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 13/988,520

(22) PCT Filed: Nov. 24, 2011

(86) PCT No.: PCT/EP2011/005908
§ 371 (c)(1),
(2), (4) Date: Jun. 12, 2013

(87) PCT Pub. No.: WO2012/072210
PCT Pub. Date: Jun. 7, 2012

(65) Prior Publication Data
US 2013/0255010 A1 Oct. 3, 2013

(30) Foreign Application Priority Data
Nov. 29, 2010 (SG) ................. 201008800-3

(51) Int. Cl.
| C09B 31/12 | (2006.01) |
| C09B 33/06 | (2006.01) |
| D06P 5/30 | (2006.01) |
| D06P 1/02 | (2006.01) |
| D06P 1/04 | (2006.01) |
| D06P 1/06 | (2006.01) |
| C09B 31/02 | (2006.01) |
| D06P 1/39 | (2006.01) |

(52) U.S. Cl.
CPC ............. C09B 31/025 (2013.01); D06P 5/30 (2013.01); D06P 1/39 (2013.01); C09B 33/06 (2013.01); *Y10S 8/917* (2013.01); *Y10S 8/918* (2013.01); *Y10S 8/919* (2013.01); *Y10S 8/924* (2013.01); *Y10S 8/926* (2013.01)
USPC ................ 8/667; 8/636; 8/404; 8/436; 8/658; 8/662; 8/664; 8/666; 8/669; 8/670; 8/680; 8/681; 8/687; 8/688; 8/917; 8/918; 8/919; 8/924; 8/926; 106/31.13; 106/31.27; 534/573; 534/580; 534/617; 534/730; 534/731; 534/816

(58) Field of Classification Search
CPC .............. D06P 1/00; D06P 1/02; D06P 1/04; D06P 1/06; D06P 1/39; D06P 3/04; D06P 3/14; D06P 3/16; D06P 3/24; D06P 3/30; D06P 3/32; D06P 3/58; D06P 3/60; D06P 5/30; C09B 29/36; C09B 35/02; C09B 37/06; C09B 67/36; C09B 67/24; C09D 11/02; C09D 11/00

USPC ............ 8/636, 404, 436, 437, 658, 662, 664, 8/666, 667, 669, 670, 680, 681, 687, 688, 8/917, 918, 919, 924, 926; 106/31.13, 106/31.27; 534/573, 580, 617, 730, 731, 534/816
See application file for complete search history.

(56) References Cited

U.S. PATENT DOCUMENTS

| 3,945,990 | A | 3/1976 | Ikeda et al. |
| 5,006,128 | A | 4/1991 | Pedrazzi |
| 5,320,648 | A * | 6/1994 | McMullan et al. ............... 8/639 |
| 5,328,995 | A * | 7/1994 | Schaulin et al. ............... 534/797 |
| 5,486,213 | A | 1/1996 | Moser et al. |
| 5,519,121 | A | 5/1996 | Renner et al. |
| 6,329,514 | B1 | 12/2001 | Huang et al. |
| 2010/0297453 | A1 | 11/2010 | Maenaka et al. |

FOREIGN PATENT DOCUMENTS

| EP | 0 017 831 A1 | 10/1980 |
| EP | 0 233 769 A2 | 8/1987 |
| EP | 0 465 420 A1 | 1/1992 |
| EP | 0 549 529 A1 | 6/1993 |
| EP | 0577 556 A1 | 1/1994 |
| EP | 0 763 576 A2 | 3/1997 |
| GB | 2036780 A | 7/1980 |
| JP | 60-243174 | 12/1985 |
| JP | 62-045665 | 2/1987 |
| JP | 11106674 | 4/1999 |
| JP | 2008-156411 A | 7/2008 |
| JP | 2010-017807 A | 1/2010 |

(Continued)

OTHER PUBLICATIONS

International Search Report for PCT/EP2011/005908 mailed Mar. 29, 2012.

*Primary Examiner* — Harold Pyon
*Assistant Examiner* — Amina Khan
(74) *Attorney, Agent, or Firm* — Drinker Biddle & Reath LLP

(57) ABSTRACT

The present invention relates to dyes of the formula (I) in which $R^1$ to $R^{10}$, $D^1$ and $D^2$ are defined as given in claim 1, a process for preparing them, and their use for dyeing and printing hydroxyl- and/or carboxamido-containing materials.

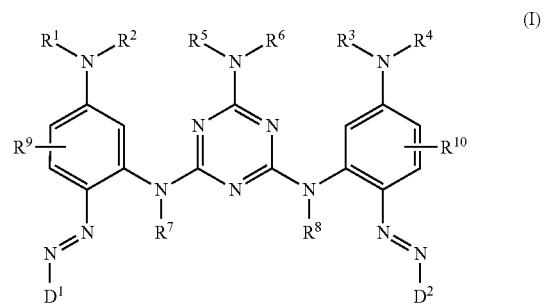

8 Claims, No Drawings

(56) References Cited

FOREIGN PATENT DOCUMENTS

| JP | 51-50326 B2 | 2/2013 |
| WO | WO-00/58407 A1 | 10/2000 |
| WO | WO-0250196 A2 | 6/2002 |
| WO | WO-2007/042767 A2 | 4/2007 |

* cited by examiner

METAL FREE ACID DYES, METHODS FOR THE PRODUCTION THEREOF AND THEIR USE

CROSS-REFERENCE TO RELATED APPLICATIONS

This application is a national stage application (under 35 U.S.C. §371) of PCT/EP2011/005908, filed Nov. 24, 2011, which claims benefit of Republic of Singapore Application No. 201008800-3, filed Nov. 29, 2010 which are both incorporated by reference.

The present invention relates to the technical field of dyestuffs for dyeing and printing of hydroxyl- and/or carboxamido-containing material.

Disazo compounds comprising a triazine moiety are known from prior art and can be used as colorants in different applications, see for example GB 2,036,780, U.S. Pat. No. 3,945,990, U.S. Pat. No. 5,006,128, U.S. Pat. No. 5,519,121, EP 0 017 831 A1, EP 0 233 769 A2, EP 0 465 420 A1, EP 0 549 529 A1, EP 0577 556 A1, EP 0 763 576 A2, JP 51-50326. JP 60-243174, JP 62-045665, JP 10-17807, JP11-106674, JP 2008-156411, WO00/58407, WO02/50196 and WO2007/042767.

In the context of the dyeing and printing of hydroxyl- and/or carboxamido-containing material the known dyes have a number of technical disadvantages, which require improvement.

Surprisingly, it has now been found that the dyes of the formula (1) as described below show highly advantageous properties over the known dyes. These include high tinctorial strength without affecting the UV-Vis spectra and characteristics of the chromophores. Additionally, it is possible to achieve a broad range of colours.

The present invention refers to dyes of the formula (1)

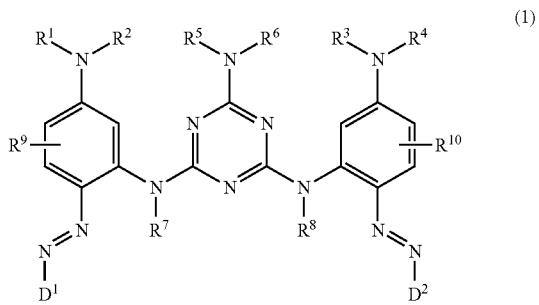

(1)

in which each of $R^1$, $R^2$, $R^3$ and $R^4$, independently from one another is hydrogen or $(C_1$-$C_6)$ alkyl;

each of $R^5$ and $R^6$, independently from one another is hydrogen, $(C_1$-$C_6)$ alkyl or $(C_1$-$C_6)$ alkyl substituted by hydroxy;

each of $R^7$ and $R^8$, independently from one another is hydrogen, $(C_1$-$C_6)$ alkyl or phenyl;

each of $R^9$ and $R^{10}$, independently from one another is hydrogen, $(C_1$-$C_6)$ alkyl, $(C_1$-$C_6)$ alkoxy, trifluoromethyl, hydroxy, cyano, nitro, halogen, —NHCHO, —NHCO($C_1$-$C_6$)-alkyl, —NHCOaryl, —NHSO$_2$($C_1$-$C_6$)-alkyl or —NHSO$_2$aryl; and each of $D^1$ and $D^2$, independently from one another is the residue of a diazo component, which comprises at least one group —SO$_3$M, wherein M is hydrogen, an alkali metal, ammonium or one equivalent of an alkali earth metal.

$(C_1$-$C_6)$ alkyl groups appearing in this application may be straight-chain or branched and are for example methyl, ethyl, n-propyl, isopropyl, n-butyl, sec-butyl, tert-butyl, isobutyl, n-pentyl, isopentyl, methylbutyl and n-hexyl. The same logic applies to alkoxy groups which for example are methoxy and ethoxy.

Aryl is in particular phenyl or naphthyl

Halogen is preferably chlorine, bromine or fluorine.

In preferred dyes of the formula (1)

$R^1$ to $R^4$ are identical and are hydrogen or $(C_1$-$C_4)$ alkyl;

$R^5$ and $R^6$ are identical and are hydrogen, $(C_1$-$C_4)$ alkyl or $(C_1$-$C_4)$ alkyl substituted by hydroxy;

$R^7$ and $R^8$ are identical and are hydrogen, methyl or ethyl; and $R^9$ and $R^{10}$ are identical and are hydrogen, methyl, ethyl or phenyl.

Especially preferred dyes of the present invention are of the formula (1a)

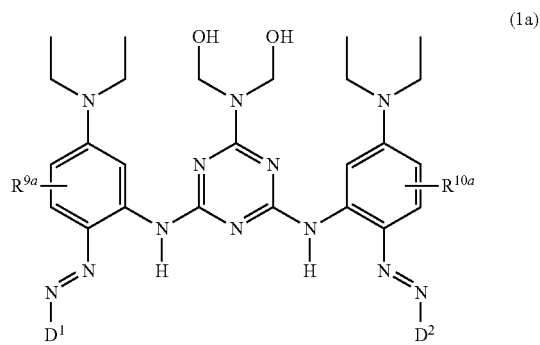

(1a)

in which $R^{9a}$ and $R^{10a}$ are identical and are hydrogen or methoxy; and $D^1$ and $D^2$ are defined as given above.

In preferred dyes of the formula (1) each of $D^1$ and $D^2$, independently of one another preferably denotes a group of the formula (I)

(I)

where $R^{11}$ is hydrogen, $(C_1$-$C_4)$-alkyl, $(C_1$-$C_4)$-alkoxy, trifluoromethyl or halogen; and M is hydrogen, an alkali metal, ammonium or one equivalent of an alkali earth metal;

or each of $D^1$ and $D^2$, independently of one another preferably denotes a group of the formula (II)

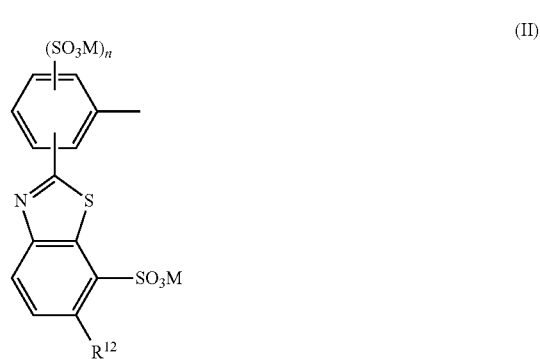

(II)

where $R^{12}$ is hydrogen or $(C_1-C_4)$-alkyl;
n is 0 or 1; and
M is defined as given above;
or
each of $D^1$ and $D^2$, independently of one another preferably denotes a group of the formula (III)

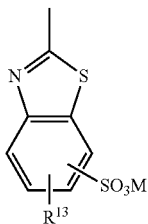
(III)

where
$R^{13}$ is hydrogen, $(C_1-C_4)$-alkyl, $(C_1-C_4)$-alkoxy or halogen; and
M is defined as given above;
or
each of $D^1$ and $D^2$, independently of one another preferably denotes a group of the formula (IV)

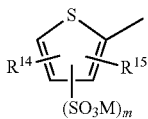
(IV)

where
$R^{14}$ is hydrogen, cyano
$R^{15}$ is hydrogen, —CHO or a group of the formula (a)

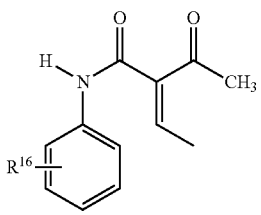
(a)

wherein $R^{16}$ is hydrogen, halogen or —CONH$_2$;
m is 0 or 1; and
M is defined as given above;

or
each of $D^1$ and $D^2$ denotes a group of the formula (V)

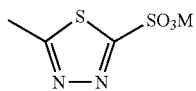
(V)

M is defined as given above; or
each of $D^1$ and $D^2$ denotes a group of the formula (VI)

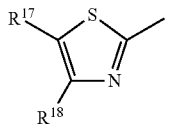
(VI)

where
$R^{17}$ is —SO$_3$M, —CHO, —CH=C(CN)$_2$, a group of the formula (a) as defined above or a group of the formula (b)

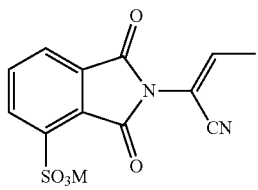
(b)

$R^{18}$ is —SO$_3$M, $(C_1-C_4)$-alkyl, sulfophenyl-$(C_1-C_4)$-alkylamino, morpholino or piperidino;
or
each of $D^1$ and $D^2$, independently of one another preferably denotes a group of the formula (VII)

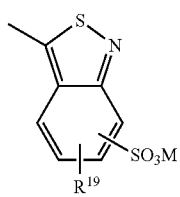
(VII)

where
$R^{19}$ is hydrogen, $(C_1-C_4)$-alkyl, $(C_1-C_4)$-alkoxy or halogen; and
M is defined as given above.
M is preferably hydrogen, lithium, sodium or potassium;
In preferred dyes of the formula (1) $D^1$ and $D^2$ are identical and denote one of the groups (I) to (VII).
Accordingly, further especially preferred dyes of the present invention are of the dyes of the formulae (1b) to (1h)

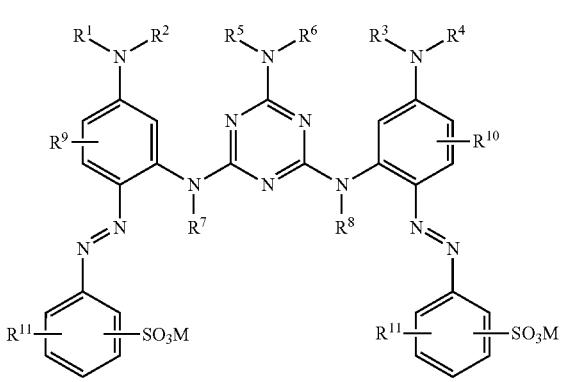
(1b)

-continued
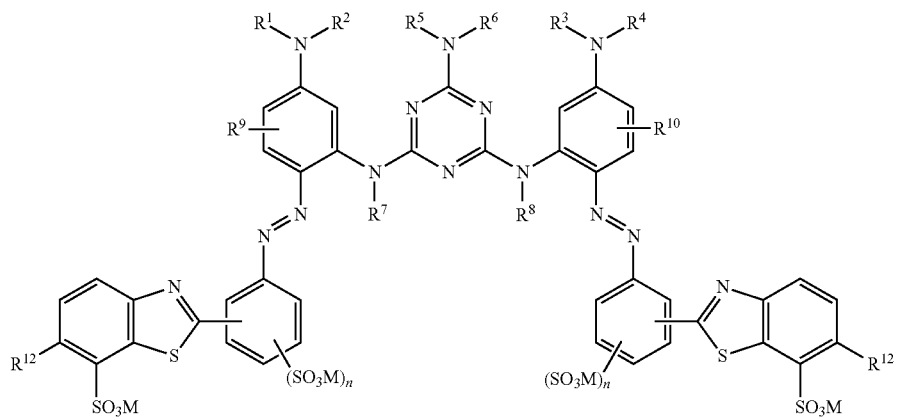
(1c)
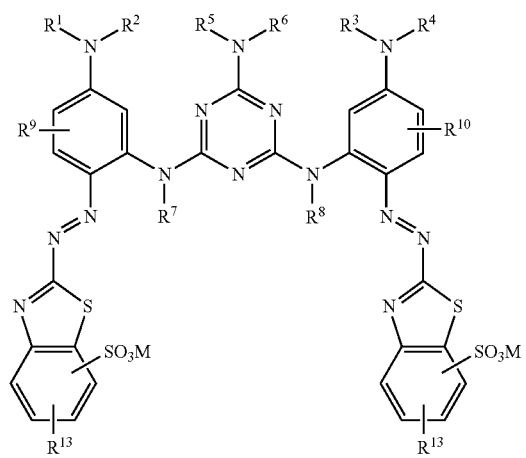
(1d)
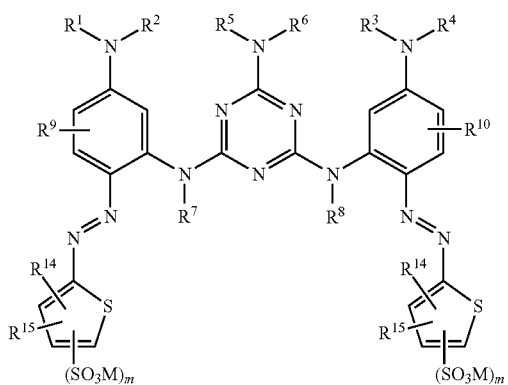
(1e)
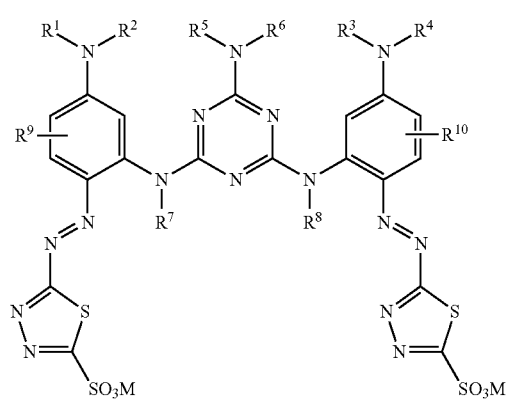
(1f)
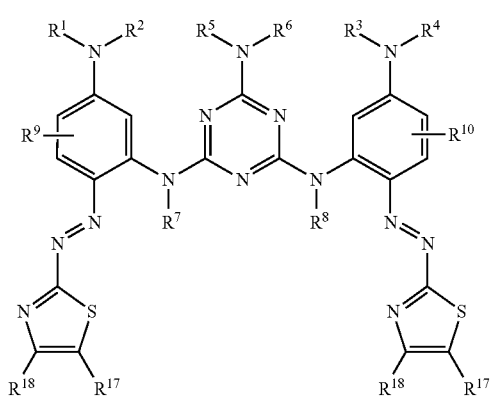
(1g)

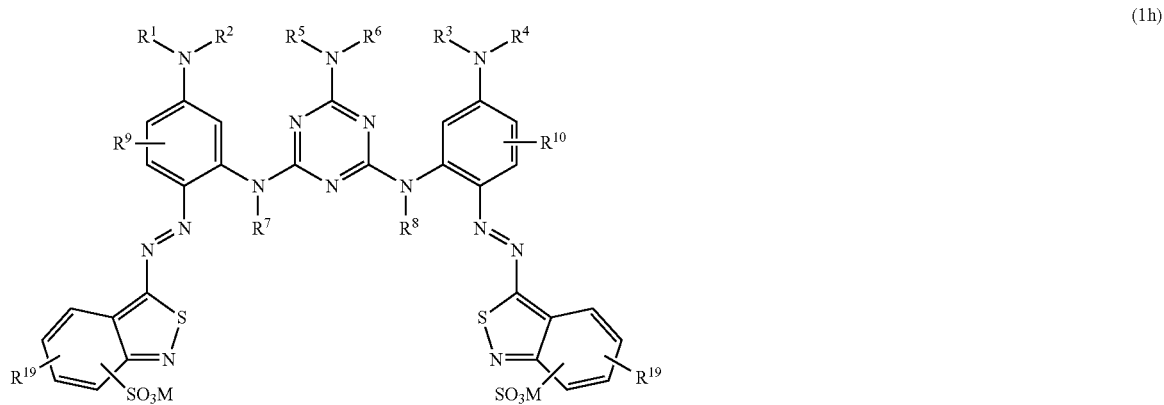
(1h)
wherein $R^1$ to $R^{19}$, M, n and m are defined as given above.
In particular preferred dyes of the present invention are the dyes of the formulae (1i) to (1o)
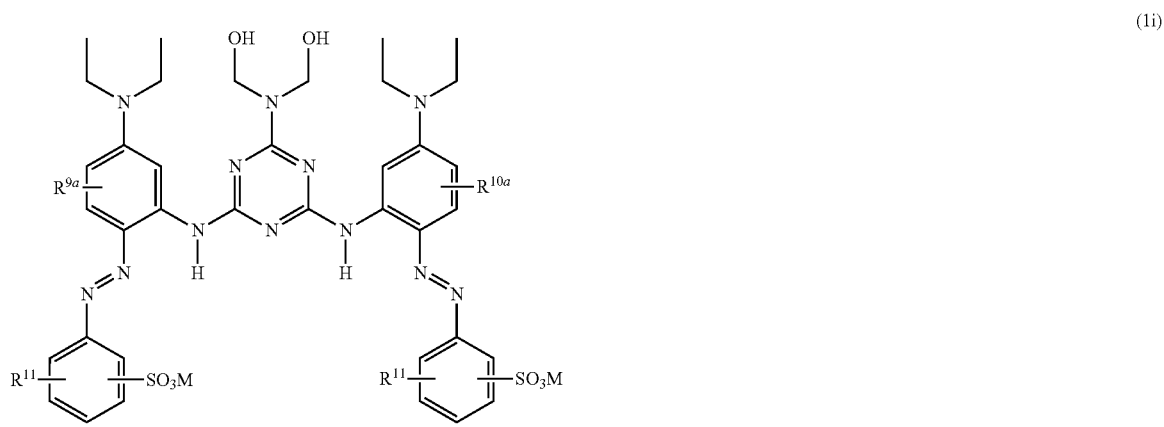
(1i)
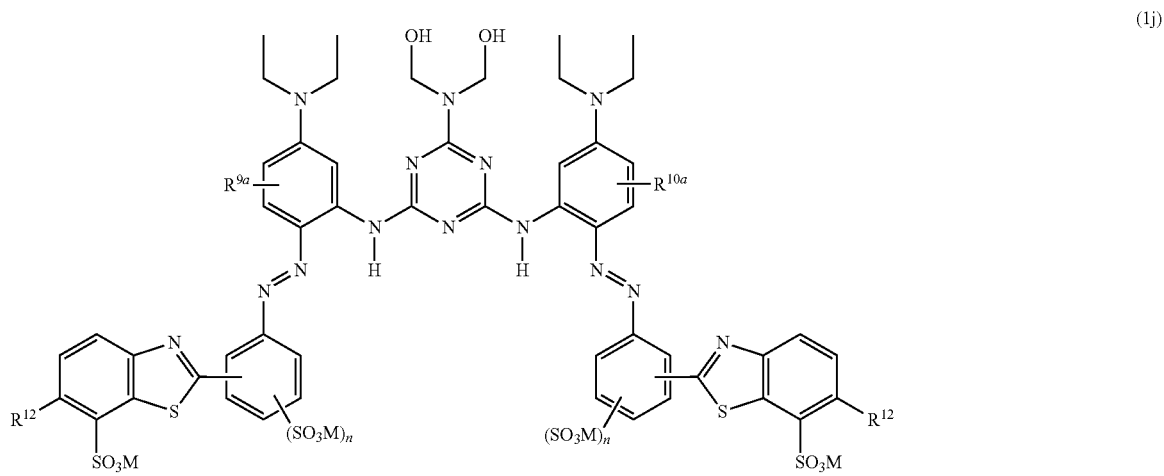
(1j)

-continued

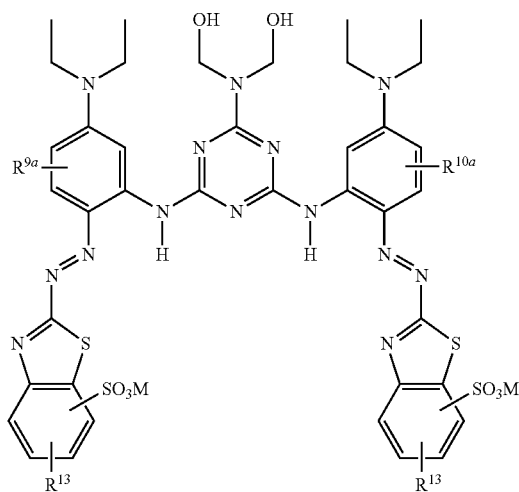
(1k)

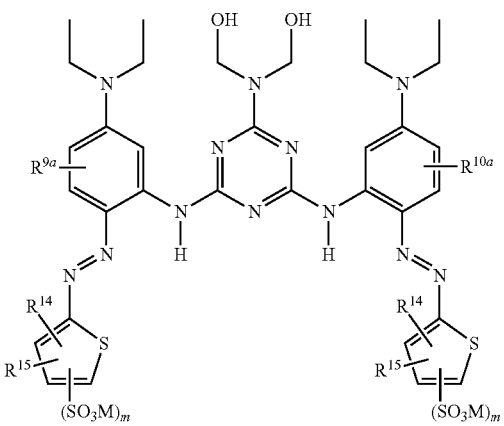
(1l)

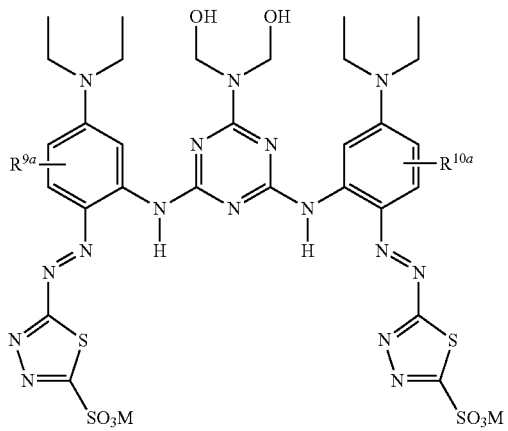
(1m)

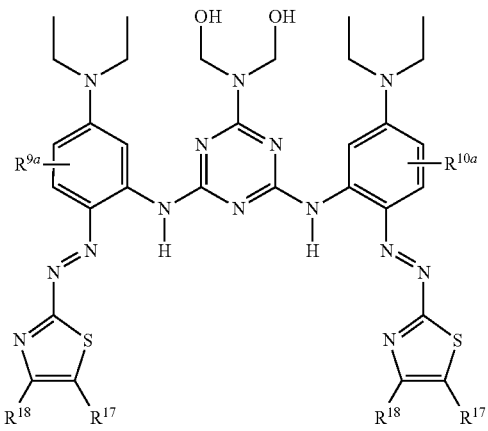
(1n)

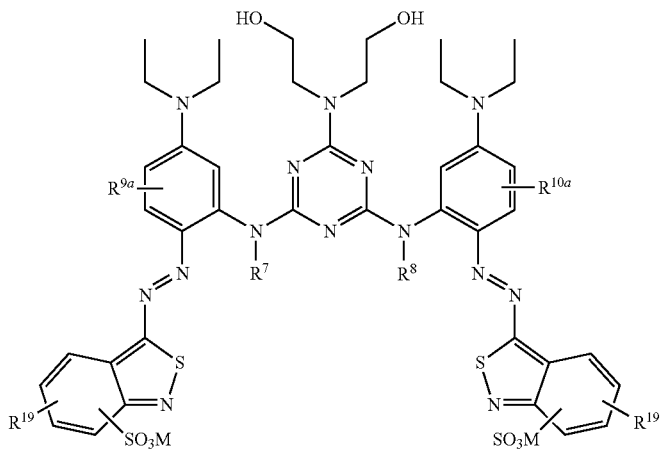
(1o)

wherein $R^{9a}$, $R^{10a}$, $R^{11}$ to $R^{19}$, M, m n and m are defined as given above.

The present invention also provides for a process for the preparation of the dyes of the formula (1) which comprises diazotization of the compounds of the formulae (2) and (3)

$$D^1\text{-}NH_2 \quad (2)$$

$$D^2\text{-}NH_2 \quad (3)$$

wherein $D^1$ and $D^2$ are defined as given above, and reacting it with a compound of the formula (4)

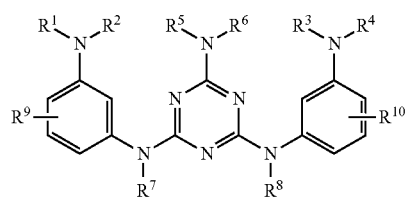
(4)

wherein $R^1$ to $R^{10}$ are defined as given above.

The diazotization of the compounds of the formulae (2) and (3) can be performed by means of diazotization methods that are known to a person skilled in the art, preferably by using sodium nitrite or nitrosylsulfuric acid in acidic medium using inorganic acids such as hydrochloric acid, sulfuric acid or phosphoric acid or mixtures thereof or organic acids such as acetic acid or propionic acid or mixtures thereof. Also mixtures of inorganic acid with organic acids can be advantageously used.

The coupling reaction of the diazotized compounds of the formulae (2) and (3) onto the compound of formula (4) can likewise be performed by known methods.

The compounds of the formula (2) to (4) are known and commercially available or can be synthesised by means of common chemical reactions known to a person skilled in the art.

The compound of the formula (4) can for example be obtained by reacting 2,4,6-trichlorotriazine with the amines of the formulae (5) to (7)

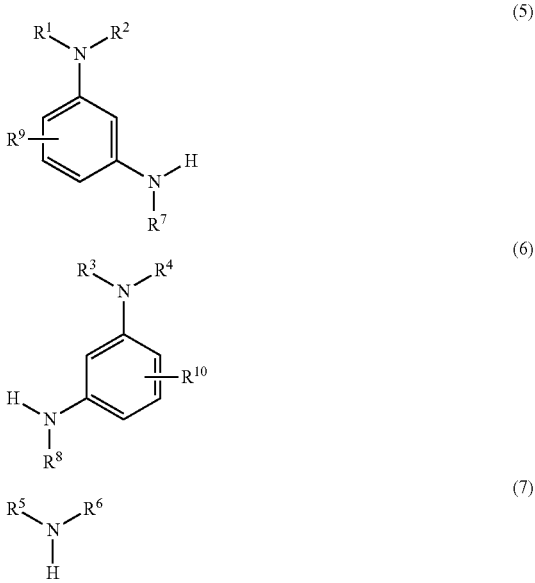

wherein $R^1$ to $R^{10}$ are defined as given above, according to condensation reactions which are known to a person skilled in the art.

The present invention also provides for the use of the present invention's dyes for dyeing or printing of hydroxyl- and/or carboxamido-containing material, or a process for dyeing or printing of hydroxyl- and/or carboxamido-containing material whereby a dye is applied to the material and fixed on the material by usual means, the process utilizing a dye in accordance with the present invention.

Hydroxyl-containing materials can be of natural or synthetic origin. Examples are cellulose fiber materials, preferably cotton, linen, hemp, jute and ramie fibers, regenerated cellulose fibers such as preferably staple viscose and filament viscose, chemically modified cellulose fibers, such as for example aminated cellulose fibers, and also polyvinyl alcohols.

Carboxamido-containing materials are for example synthetic and natural polyamides and polyurethanes, for example wool and other animal hairs, silk, leather, nylon-6,6, nylon-6, nylon-11 and nylon-4.

The hydroxyl- and/or carboxamido-containing materials mentioned can be present in various forms. For instance in the form of sheetlike structures, such as paper and leather, in the form of films, such as nylon films, or in the form of a bulk mass, for example composed of polyamide and polyurethane, in particular in the form of fibers, for example cellulose fibers. The fibers are preferably textile fibers, for example in the form of woven fabrics or yarns or in the form of hanks or wound packages.

The dyes according to the invention can be applied to the materials mentioned, especially the fiber materials mentioned, by the application techniques known for water-soluble dyes. This applies to both, dyeing and printing processes.

It applies in particular to the production of dyeings on fiber materials composed of wool or other natural polyamides or of synthetic polyamides and their mixtures with other fiber material. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C.

Since the water solubility of the dyes according to the invention is very good, they can also be used with advantage in customary continuous dyeing processes.

The dyes of the present invention can also be used in digital printing processes, in particular in digital textile printing. For this the dyes of the present invention need to be formulated in inks. Aqueous inks for digital printing which comprise a dye in accordance with the present invention likewise form part of the subject matter of the present invention.

The inks of the present invention comprise the dye of the present invention in amounts which preferably range from 0.1% by weight to 50% by weight, more preferably from 1% by weight to 30% by weight and most preferably from 1% by weight to 15% by weight, based on the total weight of the ink.

The inks, as well as the dye of the present invention, may if desired contain further dyes used in digital printing.

For the inks of the present invention to be used in the continuous flow process, a conductivity of 0.5 to 25 mS/m can be set by adding an electrolyte. Useful electrolytes include for example lithium nitrate and potassium nitrate. The inks of the present invention may include organic solvents at a total level of 1-50% and preferably 5-30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 1 to 8 alkylene groups, for example: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane ethyl acetate, ethylenediaminetetraacetate ethyl pentyl ether, 1,2-dimethoxypropane and trimethylpropane.

The inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology). Useful surface-active substances include for example: all surfactants, preferably nonionic surfactants, butyldiglycol, 1,2-hexanediol.

The inks of the present invention may further include customary additives, for example substances to inhibit fungal and bacterial growth in amounts from 0.01 to 1% by weight based on the total weight of the ink.

The inks may be prepared in a conventional manner by mixing the components in water.

The inks of the invention are particularly useful in inkjet printing processes for printing a wide variety of pretreated materials, such as silk, leather, wool, polyamide fibers and polyurethanes, and cellulosic fiber materials of any kind. Blend fabrics, for example blends of cotton, silk, wool with polyester fibers or polyamide fibers can similarly be printed.

In contrast to conventional textile printing, where the printing ink already contains all necessary chemicals, in digital or inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. In addition there is a need for thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

The examples below serve to illustrate the invention. Parts and percentages are by weigh unless noted otherwise. The relationship between parts by weight and parts by volume is that of the kilogram to the liter.

EXAMPLE 1 a) Hydrochloric acid (30%, 63.22 parts) was transferred into 250 mL round bottom flask equipped with mechanical stirrer, temperature controller and condenser. 50 parts of 4-acetylamino-2-(diethylamino) anisole (X) was added slowly. The reaction mixture was heated to 80° C. gradually whithin 1 hour. The reaction mixture was kept at 80° C. until completed. The reaction mixuture was cooled down and diluted with deionized water. After the pH was adjusted with 90 parts of 30% NaOH solution the reaction mixture was extracted with organic solvent. The organic layer was washed three times with 500 parts of deionised water and dried over anhydrous sodium sulfate. The organic layer was distilled to dryness. 28.49 parts of the product (XI) as dark brown viscous oil were obtained. The analytic data are consistent with the assigned structure for product (XI).

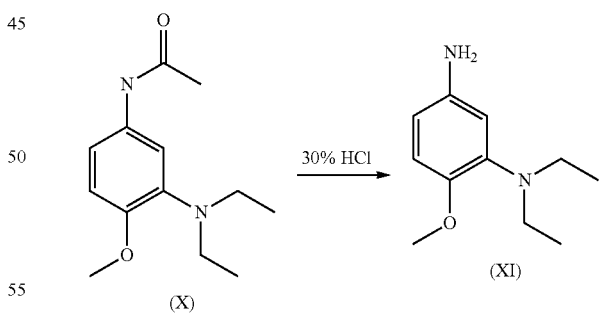

b) 109 parts of acetonitrile and 109 parts of deionised water were transferred to a 1 L round bottom flask equipped with mechanical stirrer, temperature sensor and pH probe. The reaction mixture was cooled to 0-2° C. using ice bath. 19.81 parts of cyanuric chloride (XII) were then gradually added to the reaction mixture. 43.83 parts of 3-N,N-Diethylamino-4-methoxy-aniline (XI) were dissolved in 50 parts of acetonitrile and added dropwise to the reaction mixture. The pH value was maintained at 4 to 4.5 using sodium hydroxide solution and the temperature was maintained below 2° C.

After 3 hours, the temperature was raised to room temperature and the pH was maintained at 5 to 5.5 using sodium hydroxide solution. The reaction mixture was stirred until completion. The reaction mixture was diluted with deionised water and the resulted solid was filtered and washed neutral. Upon drying 53.71 parts of solid (XIII) was obtained. The analytic data are consistent with the assigned structure for product (XIII).

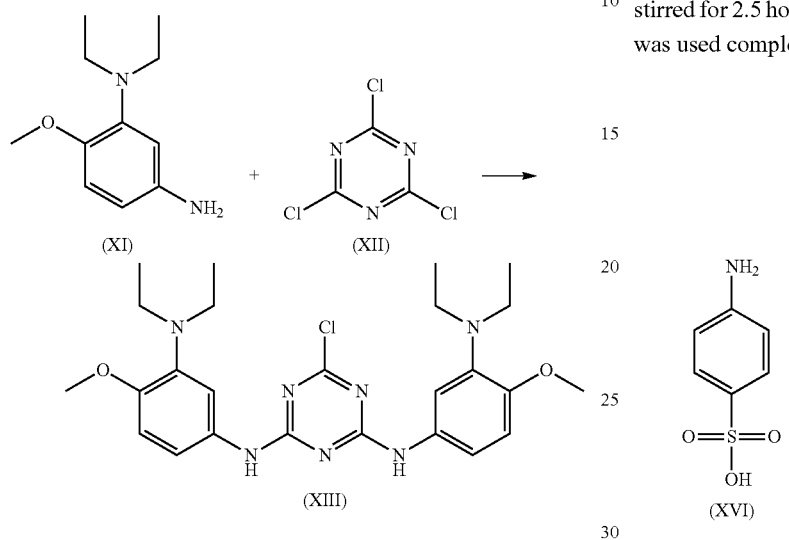

c) A reaction mixture comprising 10 parts of intermediate (XIII), 50 parts of acetonitrile, 2.26 parts of sodium bicarbonate dissolved in 3 parts of water and 2.62 parts of diethanolamine was heated to 80° C. until completion After cooling to room temperature, the reaction mixture was diluted with deionised water. The pH of the reaction mixture was adjusted to 6.5 to 7 using hydrochloric acid solution. The slurry was stirred overnight and then filtered and washed neutral with deionised water. Upon drying 11.37 parts of the product (XV) as a dark grey solid was obtained. The analytic data are consistent with the assigned structure for product (XV).

d) 6.52 parts of sulfanilic acid (XVI) were taken into 80 parts of deionised water. The pH of the mixture was adjusted to 6.3 when clear solution was obtained. The solution was cooled down to 0-5° C. using ice-salt mixture. 7.53 parts of 5N sodium nitrite solution were added dropwise into the reaction mixture, followed by fast addition of 7.71 parts of 37% HCl to the reaction mixture. The reaction mixture was stirred for 2.5 hours at 0-5° C. and the resulted diazonium salt was used completely for the following coupling step.

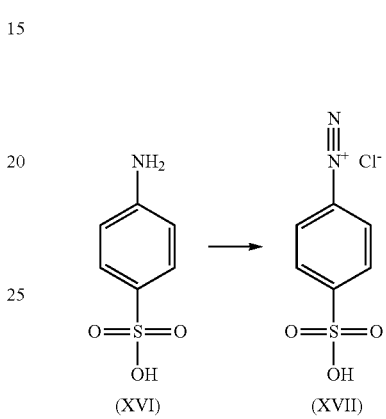

e) 10 parts of the coupler (XV) was and 0.36 parts of sulphamic acid were mixed with 50 mL of deionised water and 150 mL of acetonitrile. The pH of the resulted mixture was adjusted to pH 5.6 using hydrochloric acid. The reaction mixture was cooled down to 0-5° C. using ice-salt mixture. The diazonium salt (XVII) was added dropwise to the coupler

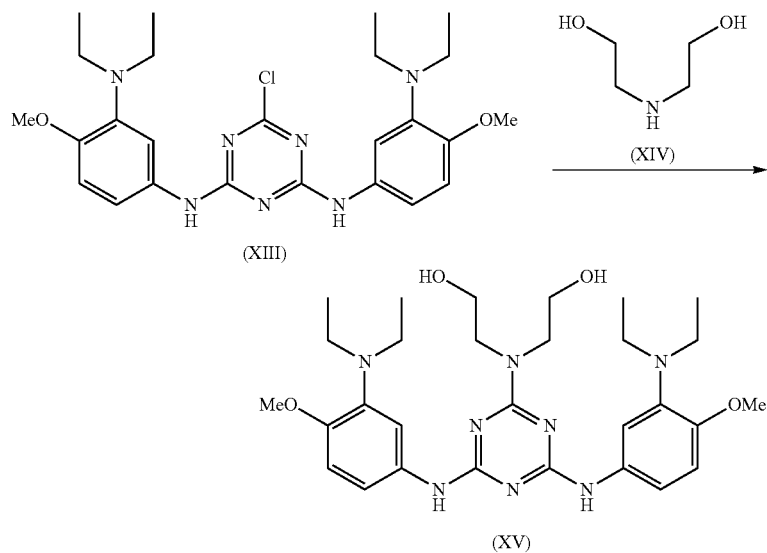

solution while maintaining the pH at 5.5 using sodium hydroxide solution. The reaction mixture was stirred for 3 hrs and the reaction was completed. After distillation under reduced pressure the pH was adjusted to 5 using hydrochloric acid. Upon addition of sodium chloride, the resulted slurry was filtered and washed neutral. Upon drying 13.66 parts of the acid dye (1-1) were obtained. The analytic data are consistent with the assigned structure for the dye (1-1).

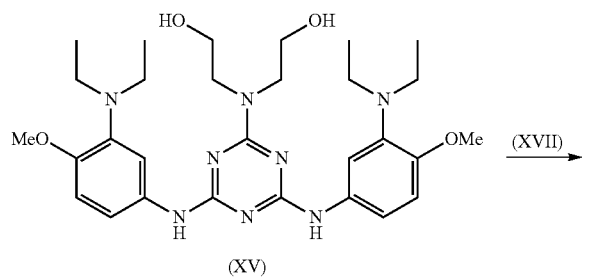

(XV)

$\xrightarrow{\text{(XVII)}}$

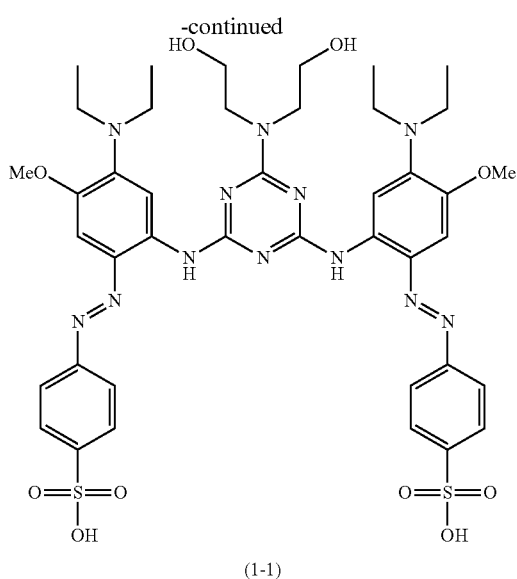

(1-1)

The inventive dyes of the following table can be obtained in analogy to the process described in Example 1 above.

| Example | |
|---|---|
| 1-2 | 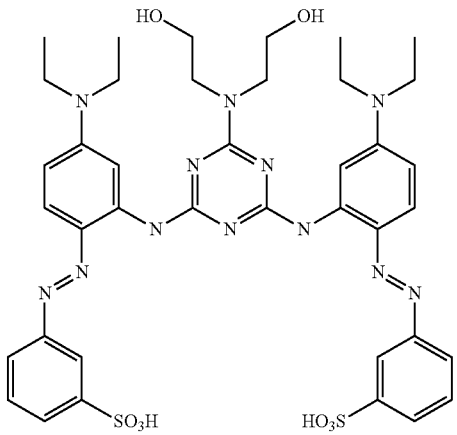 [SMILES: CCN(CC)c1ccc(/N=N/c2cccc(S(=O)(=O)O)c2)c(Nc2nc(Nc3cc(N(CC)CC)ccc3/N=N/c3cccc(S(=O)(=O)O)c3)nc(N(CCO)CCO)n2)c1] |
| 1-3 | 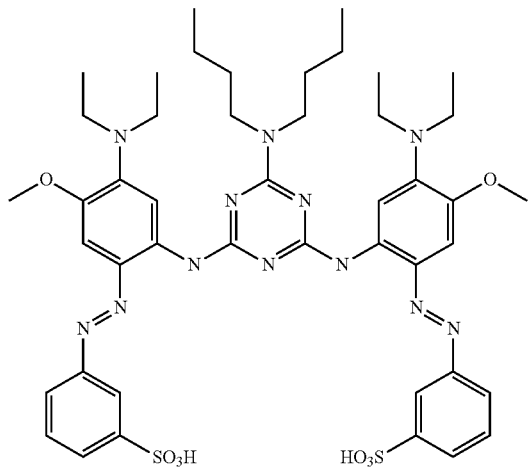 |

-continued
Example
1-4
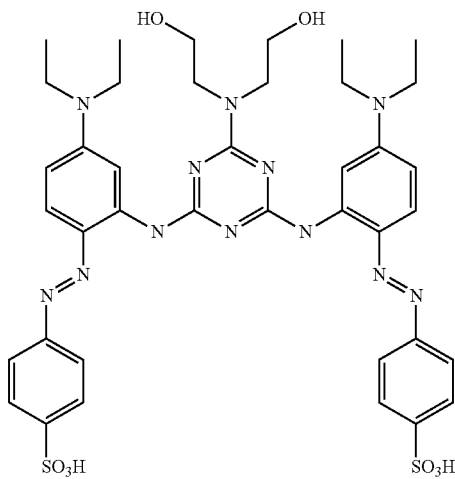 [SMILES: CCN(CC)c1ccc(/N=N/c2ccc(S(=O)(=O)O)cc2)c(Nc2nc(Nc3cc(N(CC)CC)ccc3/N=N/c3ccc(S(=O)(=O)O)cc3)nc(N(CCO)CCO)n2)c1]
1-5
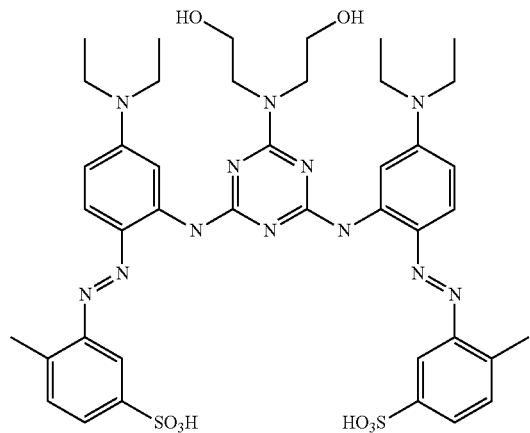
1-6
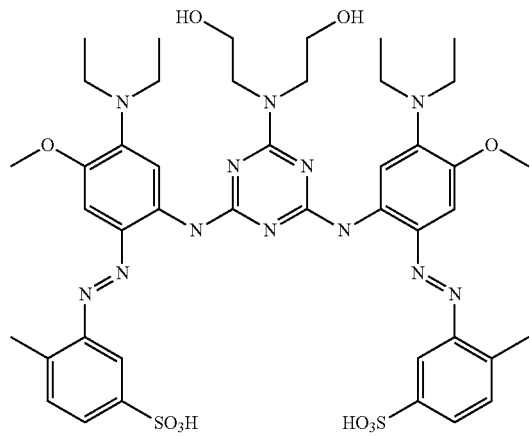

-continued
Example
1-7
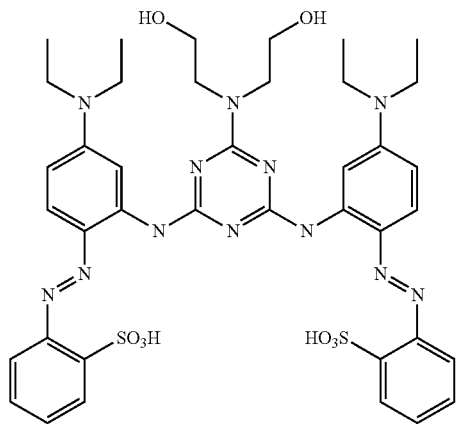 [SMILES: CCN(CC)c1ccc(/N=N/c2ccccc2S(=O)(=O)O)c(Nc2nc(Nc3cc(N(CC)CC)ccc3/N=N/c3ccccc3S(=O)(=O)O)nc(N(CCO)CCO)n2)c1]
1-8
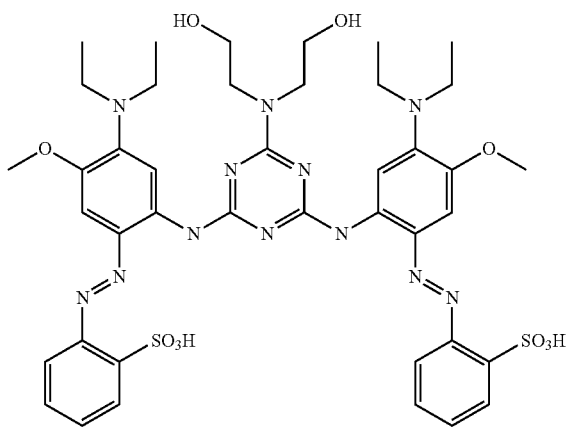 [SMILES: CCN(CC)c1cc(Nc2nc(Nc3cc(N(CC)CC)c(OC)cc3/N=N/c3ccccc3S(=O)(=O)O)nc(N(CCO)CCO)n2)c(/N=N/c2ccccc2S(=O)(=O)O)cc1OC]
1-9
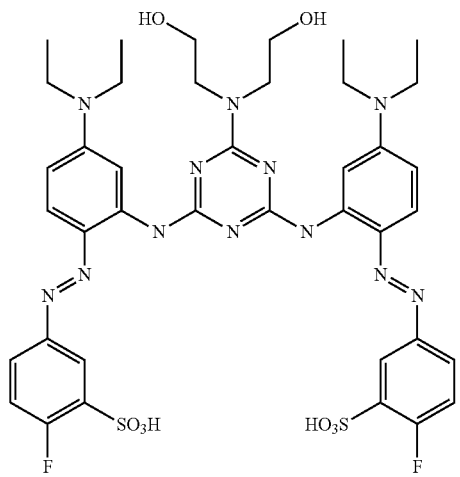 [SMILES: CCN(CC)c1ccc(/N=N/c2ccc(F)c(S(=O)(=O)O)c2)c(Nc2nc(Nc3cc(N(CC)CC)ccc3/N=N/c3ccc(F)c(S(=O)(=O)O)c3)nc(N(CCO)CCO)n2)c1]

-continued
| Example | |
|---|---|
| 1-10 | 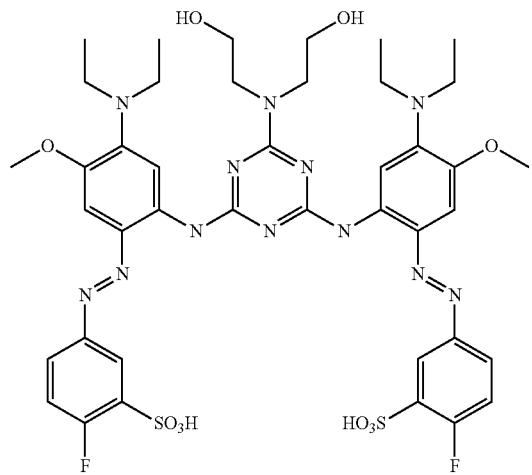 |
| 1-11 | 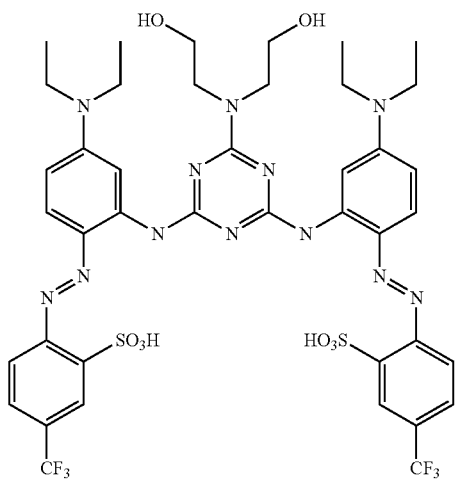 [SMILES: CCN(CC)c1ccc(/N=N/c2ccc(C(F)(F)F)cc2S(=O)(=O)O)c(Nc2nc(Nc3cc(N(CC)CC)ccc3/N=N/c3ccc(C(F)(F)F)cc3S(=O)(=O)O)nc(N(CCO)CCO)n2)c1] |
| 1-12 | 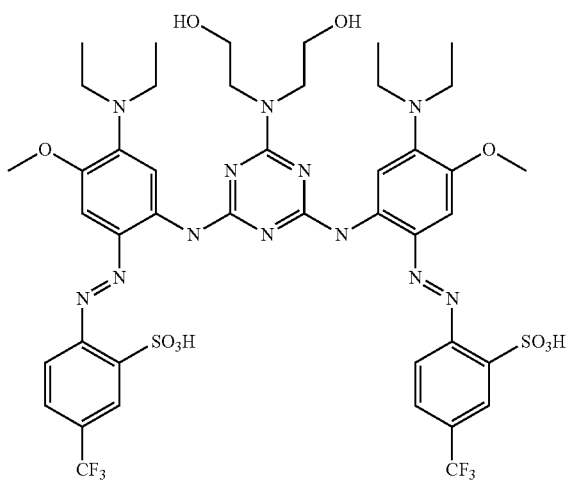 [SMILES: CCN(CC)c1cc(Nc2nc(Nc3cc(N(CC)CC)c(OC)cc3/N=N/c3ccc(C(F)(F)F)cc3S(=O)(=O)O)nc(N(CCO)CCO)n2)c(/N=N/c2ccc(C(F)(F)F)cc2S(=O)(=O)O)cc1OC] |

-continued
| Example | |
|---|---|
| 1-13 | 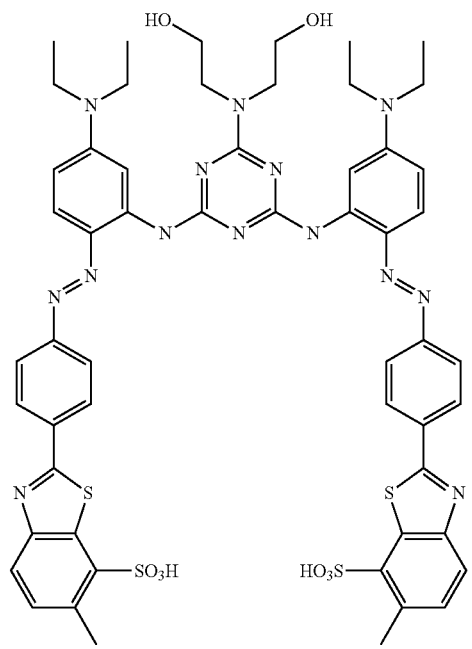 [SMILES: CCN(CC)c1ccc(/N=N/c2ccc(-c3nc4ccc(C)c(S(=O)(=O)O)c4s3)cc2)c(Nc2nc(Nc3cc(N(CC)CC)ccc3/N=N/c3ccc(-c4nc5ccc(C)c(S(=O)(=O)O)c5s4)cc3)nc(N(CCO)CCO)n2)c1] |
| 1-14 | 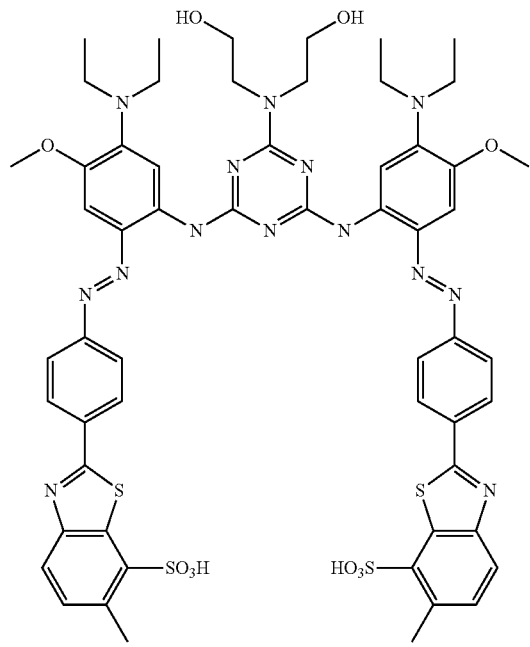 |

| Example | |
|---|---|
| 1-15 | 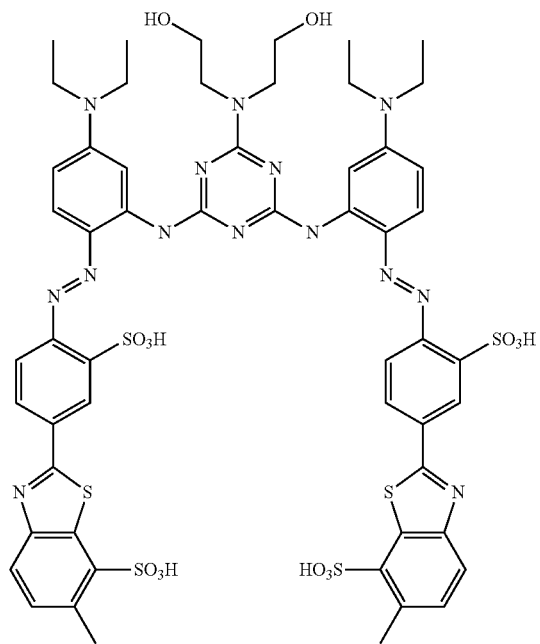 [SMILES: CCN(CC)c1ccc(/N=N/c2ccc(-c3nc4ccc(C)c(S(=O)(=O)O)c4s3)cc2S(=O)(=O)O)c(Nc2nc(Nc3cc(N(CC)CC)ccc3/N=N/c3ccc(-c4nc5ccc(C)c(S(=O)(=O)O)c5s4)cc3S(=O)(=O)O)nc(N(CCO)CCO)n2)c1] |
| 1-16 | 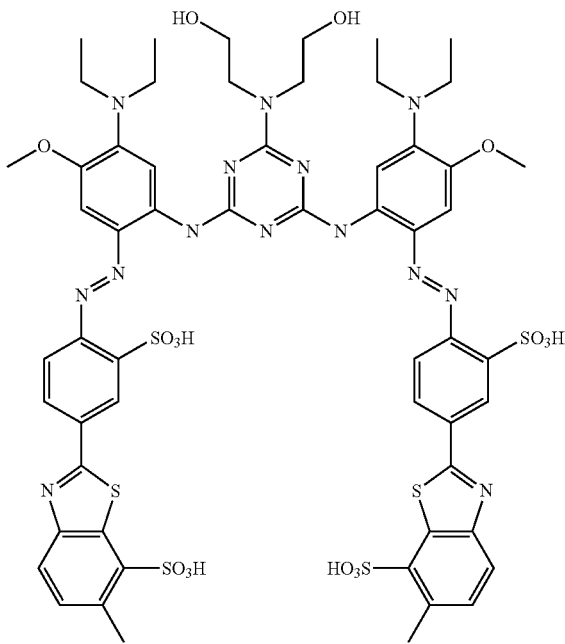 [SMILES: CCN(CC)c1cc(Nc2nc(Nc3cc(N(CC)CC)c(OC)cc3/N=N/c3ccc(-c4nc5ccc(C)c(S(=O)(=O)O)c5s4)cc3S(=O)(=O)O)nc(N(CCO)CCO)n2)c(/N=N/c2ccc(-c3nc4ccc(C)c(S(=O)(=O)O)c4s3)cc2S(=O)(=O)O)cc1OC] |

-continued
| Example | |
|---|---|
| 1-17 | 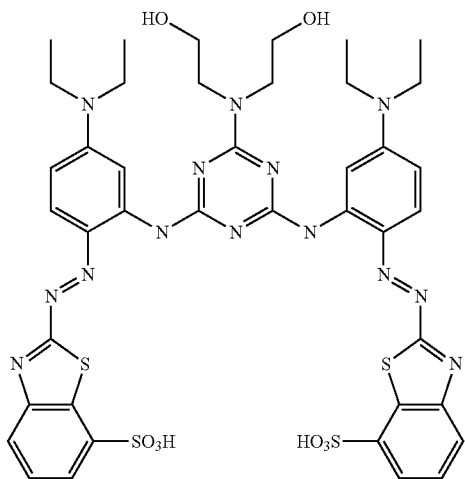 [SMILES: CCN(CC)c1ccc(/N=N/c2nc3cccc(S(=O)(=O)O)c3s2)c(Nc2nc(Nc3cc(N(CC)CC)ccc3/N=N/c3nc4cccc(S(=O)(=O)O)c4s3)nc(N(CCO)CCO)n2)c1] |
| 1-18 | 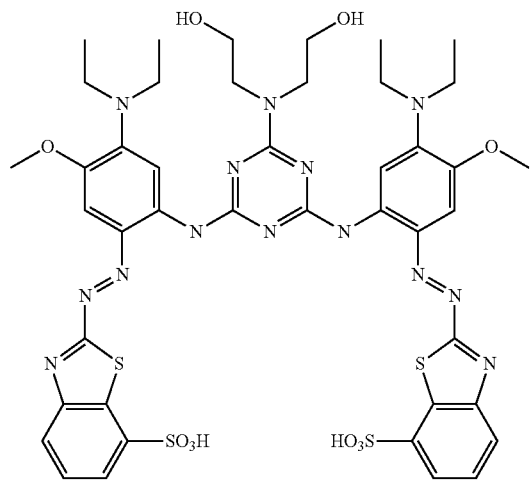 |
| 1-19 | 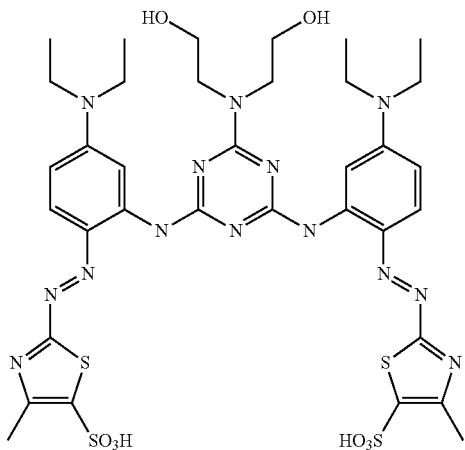 |

| Example | |
|---|---|
| 1-20 | 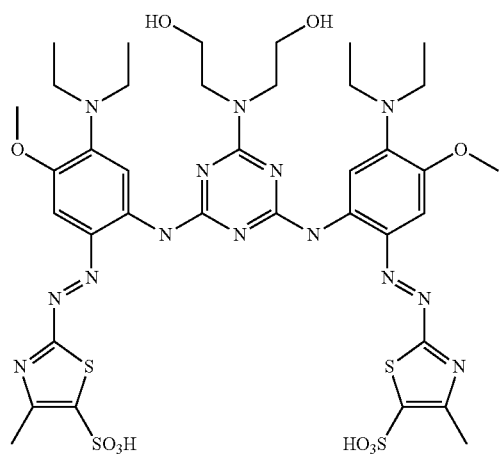 |
| 1-21 | 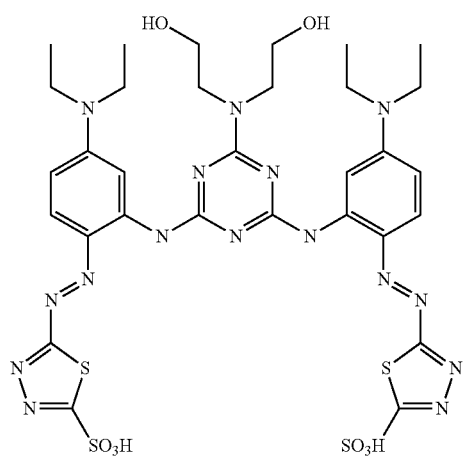 [SMILES: CCN(CC)c1ccc(/N=N/c2nnc(S(=O)(=O)O)s2)c(Nc2nc(Nc3cc(N(CC)CC)ccc3/N=N/c3nnc(S(=O)(=O)O)s3)nc(N(CCO)CCO)n2)c1] |
| 1-22 | 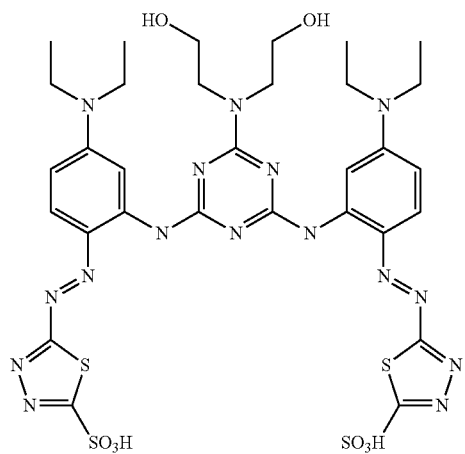 [SMILES: CCN(CC)c1ccc(/N=N/c2nnc(S(=O)(=O)O)s2)c(Nc2nc(Nc3cc(N(CC)CC)ccc3/N=N/c3nnc(S(=O)(=O)O)s3)nc(N(CCO)CCO)n2)c1] |

| Example | |
|---|---|
| 1-23 | 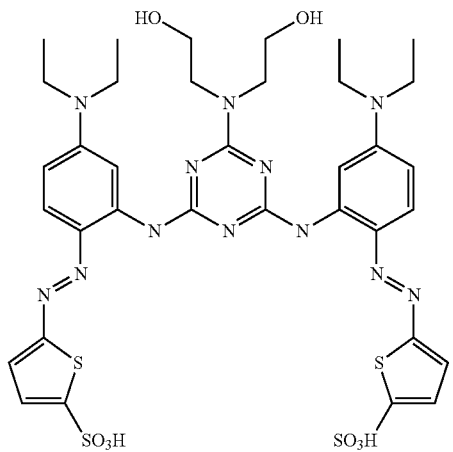 [SMILES: CCN(CC)c1ccc(/N=N/c2ccc(S(=O)(=O)O)s2)c(Nc2nc(Nc3cc(N(CC)CC)ccc3/N=N/c3ccc(S(=O)(=O)O)s3)nc(N(CCO)CCO)n2)c1] |
| 1-24 | 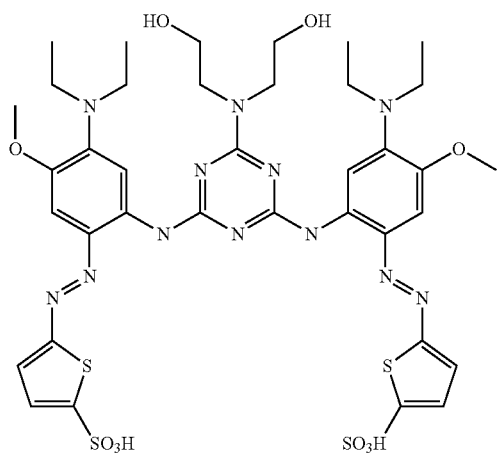 [SMILES: CCN(CC)c1cc(Nc2nc(Nc3cc(N(CC)CC)c(OC)cc3/N=N/c3ccc(S(=O)(=O)O)s3)nc(N(CCO)CCO)n2)c(/N=N/c2ccc(S(=O)(=O)O)s2)cc1OC] |
| 1-25 | 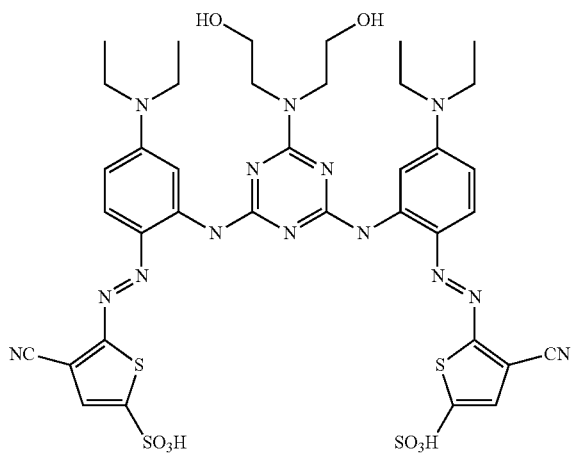 [SMILES: CCN(CC)c1ccc(/N=N/c2sc(S(=O)(=O)O)cc2C#N)c(Nc2nc(Nc3cc(N(CC)CC)ccc3/N=N/c3sc(S(=O)(=O)O)cc3C#N)nc(N(CCO)CCO)n2)c1] |

-continued
| Example | |
|---|---|
| 1-26 | 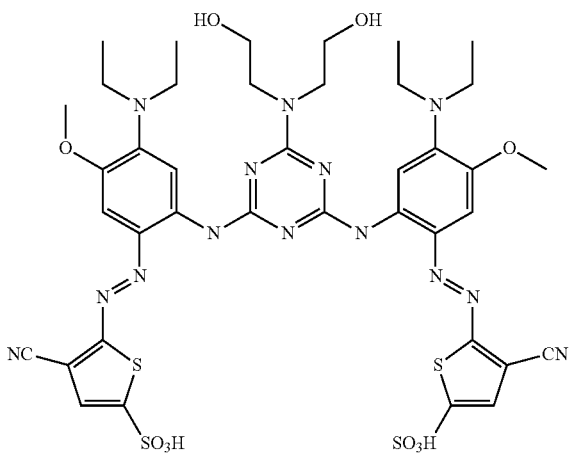 [SMILES: CCN(CC)c1cc(Nc2nc(Nc3cc(N(CC)CC)c(OC)cc3/N=N/c3sc(S(=O)(=O)O)cc3C#N)nc(N(CCO)CCO)n2)c(/N=N/c2sc(S(=O)(=O)O)cc2C#N)cc1OC] |
| 1-27 | 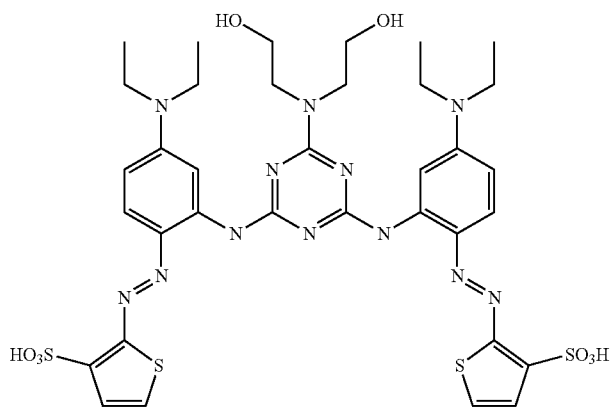 [SMILES: CCN(CC)c1ccc(/N=N/c2sccc2S(=O)(=O)O)c(Nc2nc(Nc3cc(N(CC)CC)ccc3/N=N/c3sccc3S(=O)(=O)O)nc(N(CCO)CCO)n2)c1] |
| 1-28 | 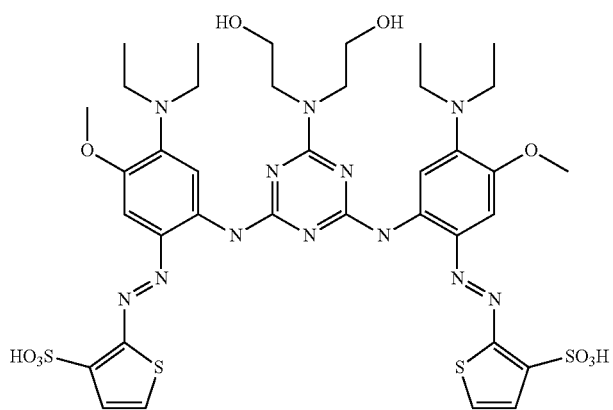 [SMILES: CCN(CC)c1cc(Nc2nc(Nc3cc(N(CC)CC)c(OC)cc3/N=N/c3sccc3S(=O)(=O)O)nc(N(CCO)CCO)n2)c(/N=N/c2sccc2S(=O)(=O)O)cc1OC] |

-continued
| Example | |
|---|---|
| 1-29 | 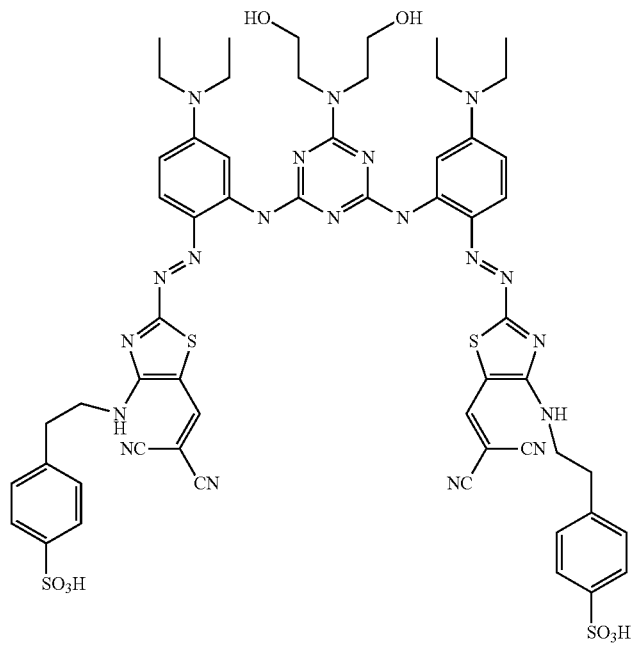 [SMILES: CCN(CC)c1ccc(/N=N/c2nc(NCCc3ccc(S(=O)(=O)O)cc3)c(C=C(C#N)C#N)s2)c(Nc2nc(Nc3cc(N(CC)CC)ccc3/N=N/c3nc(NCCc4ccc(S(=O)(=O)O)cc4)c(C=C(C#N)C#N)s3)nc(N(CCO)CCO)n2)c1] |
| 1-30 | 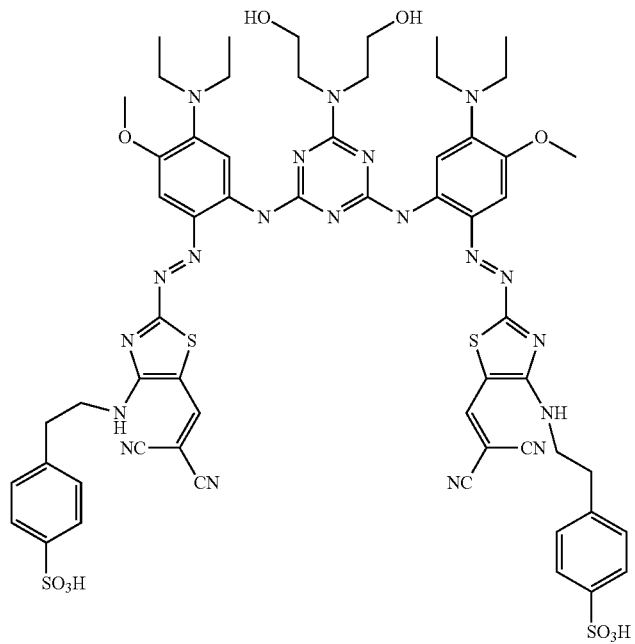 [SMILES: CCN(CC)c1cc(Nc2nc(Nc3cc(N(CC)CC)c(OC)cc3/N=N/c3nc(NCCc4ccc(S(=O)(=O)O)cc4)c(C=C(C#N)C#N)s3)nc(N(CCO)CCO)n2)c(/N=N/c2nc(NCCc3ccc(S(=O)(=O)O)cc3)c(C=C(C#N)C#N)s2)cc1OC] |

| Example | |
|---|---|
| 1-31 | 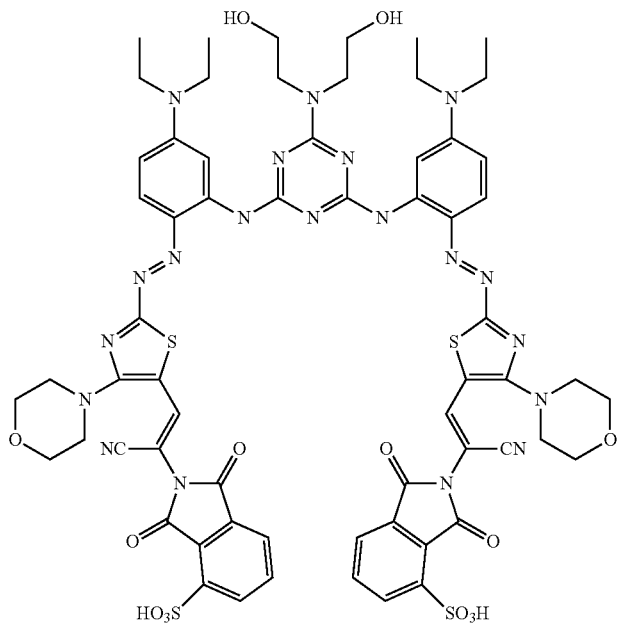 [SMILES: CCN(CC)c1ccc(/N=N/c2nc(N3CCOCC3)c(/C=C(\C#N)N3C(=O)c4cccc(S(=O)(=O)O)c4C3=O)s2)c(Nc2nc(Nc3cc(N(CC)CC)ccc3/N=N/c3nc(N4CCOCC4)c(/C=C(\C#N)N4C(=O)c5cccc(S(=O)(=O)O)c5C4=O)s3)nc(N(CCO)CCO)n2)c1] |
| 1-32 | 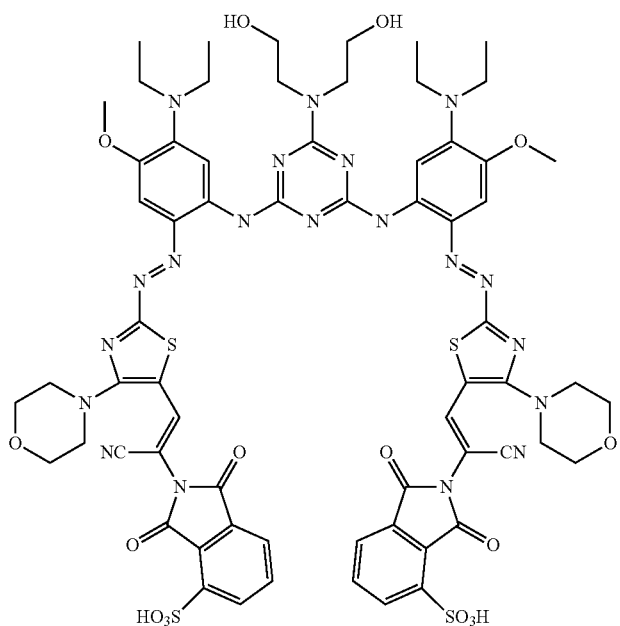 [SMILES: CCN(CC)c1cc(Nc2nc(Nc3cc(N(CC)CC)c(OC)cc3/N=N/c3nc(N4CCOCC4)c(/C=C(\C#N)N4C(=O)c5cccc(S(=O)(=O)O)c5C4=O)s3)nc(N(CCO)CCO)n2)c(/N=N/c2nc(N3CCOCC3)c(/C=C(\C#N)N3C(=O)c4cccc(S(=O)(=O)O)c4C3=O)s2)cc1OC] |

| Example | |
|---|---|
| 1-33 | 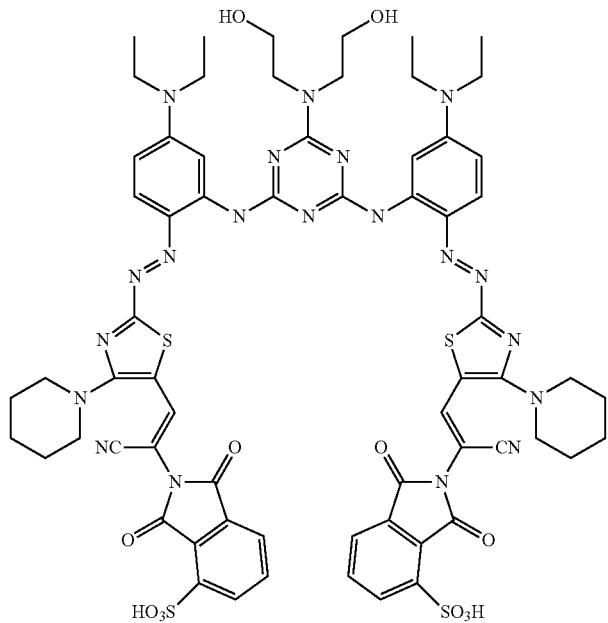 [SMILES: CCN(CC)c1ccc(/N=N/c2nc(N3CCCCC3)c(/C=C(\C#N)N3C(=O)c4cccc(S(=O)(=O)O)c4C3=O)s2)c(Nc2nc(Nc3cc(N(CC)CC)ccc3/N=N/c3nc(N4CCCCC4)c(/C=C(\C#N)N4C(=O)c5cccc(S(=O)(=O)O)c5C4=O)s3)nc(N(CCO)CCO)n2)c1] |
| 1-34 | 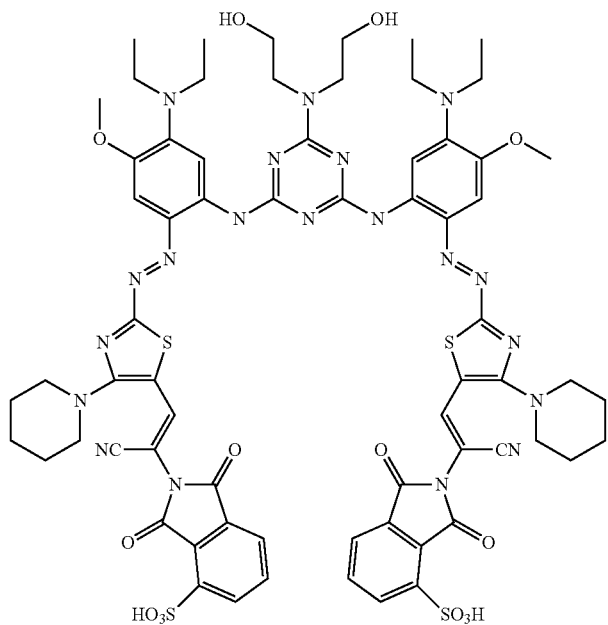 [SMILES: CCN(CC)c1cc(Nc2nc(Nc3cc(N(CC)CC)c(OC)cc3/N=N/c3nc(N4CCCCC4)c(/C=C(\C#N)N4C(=O)c5cccc(S(=O)(=O)O)c5C4=O)s3)nc(N(CCO)CCO)n2)c(/N=N/c2nc(N3CCCCC3)c(/C=C(\C#N)N3C(=O)c4cccc(S(=O)(=O)O)c4C3=O)s2)cc1OC] |

| Example | |
|---|---|
| 1-35 | 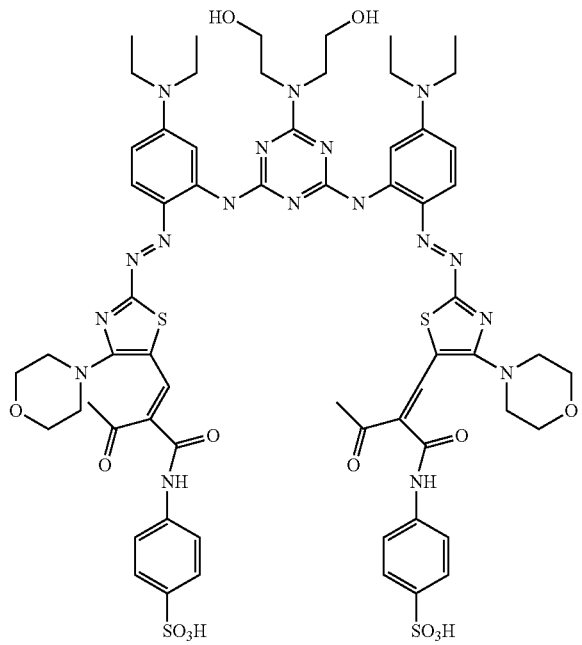 [SMILES: CCN(CC)c1ccc(/N=N/c2nc(N3CCOCC3)c(C=C(C(C)=O)C(=O)Nc3ccc(S(=O)(=O)O)cc3)s2)c(Nc2nc(Nc3cc(N(CC)CC)ccc3/N=N/c3nc(N4CCOCC4)c(/C=C(\C(C)=O)C(=O)Nc4ccc(S(=O)(=O)O)cc4)s3)nc(N(CCO)CCO)n2)c1] |
| 1-36 | 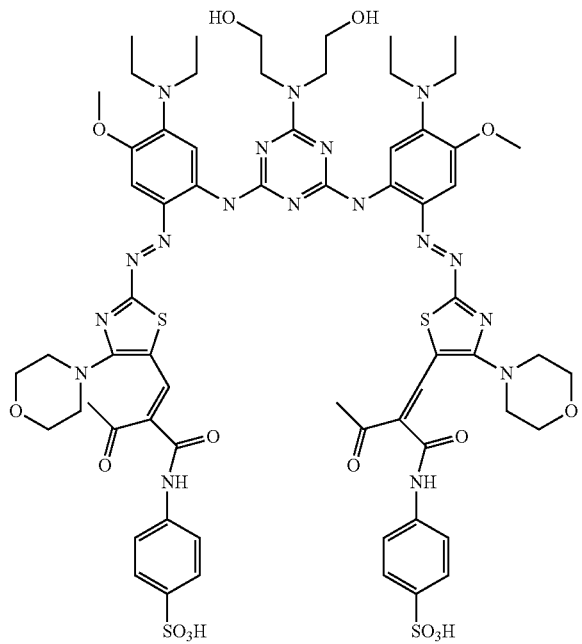 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccc(S(=O)(=O)O)cc4)s3)nc(N(CCO)CCO)n2)c(/N=N/c2nc(N3CCOCC3)c(C=C(C(C)=O)C(=O)Nc3ccc(S(=O)(=O)O)cc3)s2)cc1OC] |

| Example | |
|---|---|
| 1-37 | 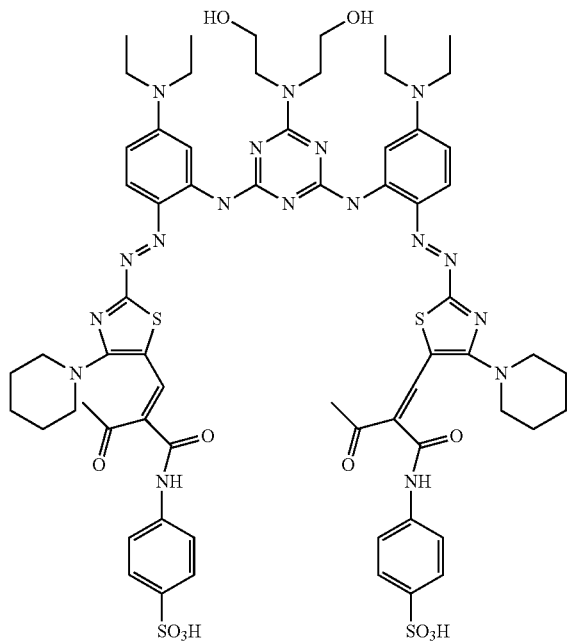 [SMILES: CCN(CC)c1ccc(/N=N/c2nc(N3CCCCC3)c(C=C(C(C)=O)C(=O)Nc3ccc(S(=O)(=O)O)cc3)s2)c(Nc2nc(Nc3cc(N(CC)CC)ccc3/N=N/c3nc(N4CCCCC4)c(/C=C(\C(C)=O)C(=O)Nc4ccc(S(=O)(=O)O)cc4)s3)nc(N(CCO)CCO)n2)c1] |
| 1-38 | 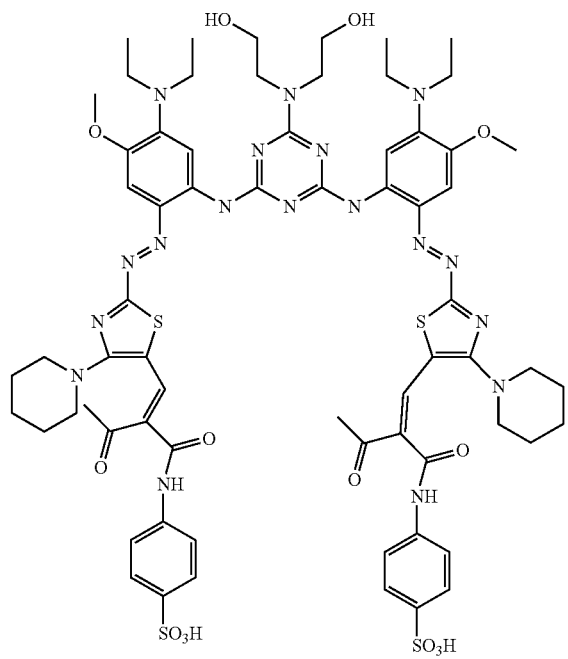 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccc(S(=O)(=O)O)cc4)s3)nc(N(CCO)CCO)n2)c(/N=N/c2nc(N3CCCCC3)c(/C=C(/C(C)=O)C(=O)Nc3ccc(S(=O)(=O)O)cc3)s2)cc1OC] |

-continued
| Example | |
|---|---|
| 1-39 | 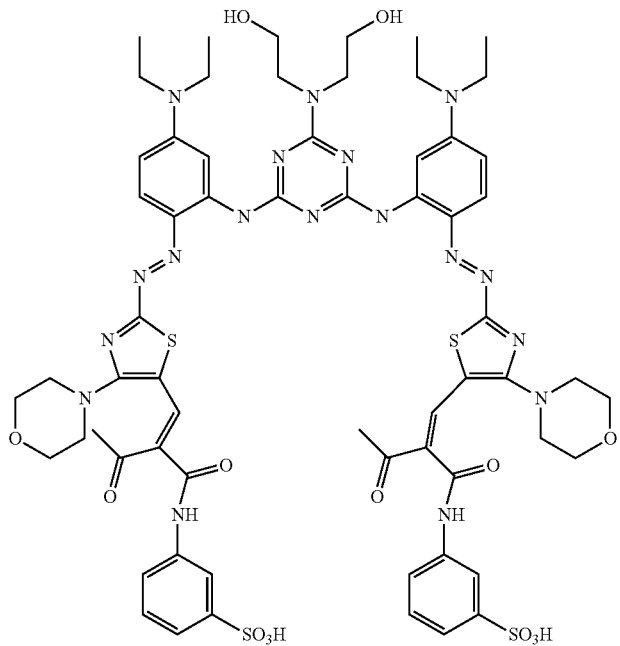 [SMILES: CCN(CC)c1ccc(/N=N/c2nc(N3CCOCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCOCC4)c(/C=C(\C(C)=O)C(=O)Nc4cccc(S(=O)(=O)O)c4)s3)nc(N(CCO)CCO)n2)c1] |
| 1-40 | 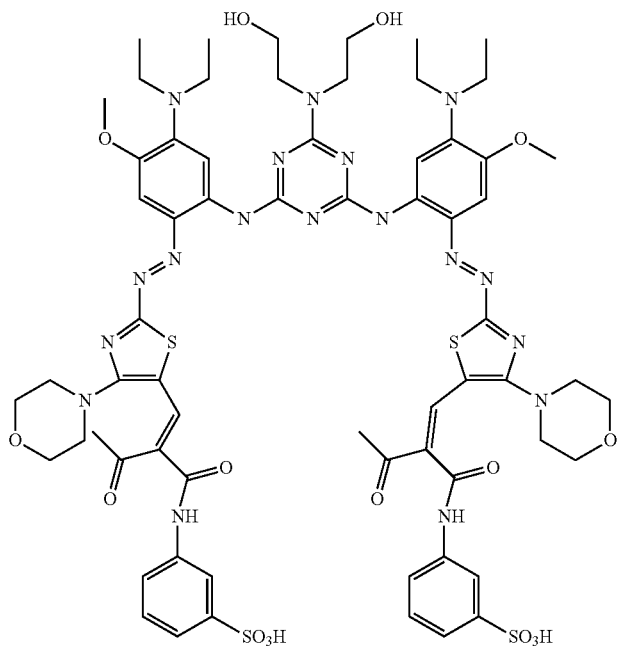 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4cccc(S(=O)(=O)O)c4)s3)nc(N(CCO)CCO)n2)c(/N=N/c2nc(N3CCOCC3)c(/C=C(/C(C)=O)C(=O)Nc3cccc(S(=O)(=O)O)c3)s2)cc1OC] |

| Example | |
|---|---|
| 1-41 | 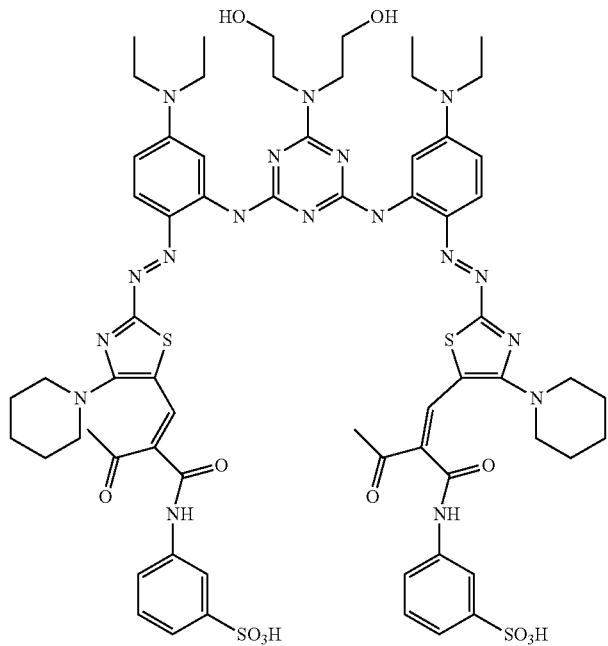 [SMILES: CCN(CC)c1ccc(/N=N/c2nc(N3CCCCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCCCC4)c(/C=C(\C(C)=O)C(=O)Nc4cccc(S(=O)(=O)O)c4)s3)nc(N(CCO)CCO)n2)c1] |
| 1-42 | 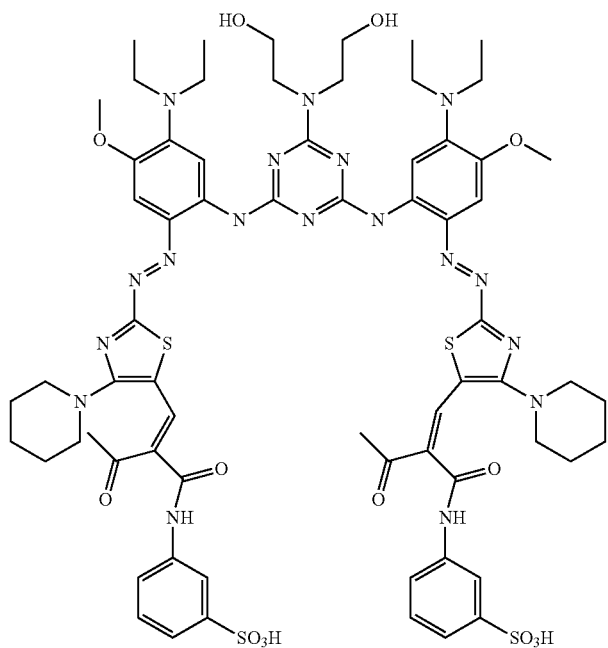 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4cccc(S(=O)(=O)O)c4)s3)nc(N(CCO)CCO)n2)c(/N=N/c2nc(N3CCCCC3)c(/C=C(/C(C)=O)C(=O)Nc3cccc(S(=O)(=O)O)c3)s2)cc1OC] |

| Example | |
|---|---|
| 1-43 | 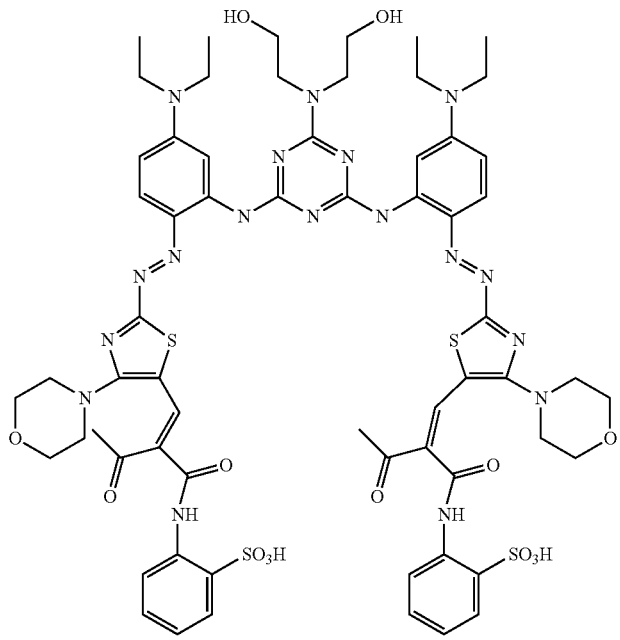 [SMILES: CCN(CC)c1ccc(/N=N/c2nc(N3CCOCC3)c(/C=C(/C(C)=O)C(=O)Nc3ccccc3S(=O)(=O)O)s2)c(Nc2nc(Nc3cc(N(CC)CC)ccc3/N=N/c3nc(N4CCOCC4)c(/C=C(\C(C)=O)C(=O)Nc4ccccc4S(=O)(=O)O)s3)nc(N(CCO)CCO)n2)c1] |
| 1-44 | 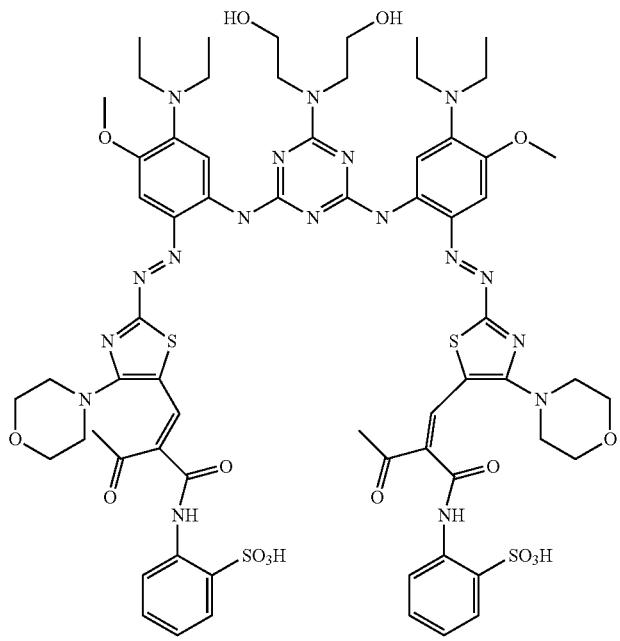 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccccc4S(=O)(=O)O)s3)nc(N(CCO)CCO)n2)c(/N=N/c2nc(N3CCOCC3)c(/C=C(/C(C)=O)C(=O)Nc3ccccc3S(=O)(=O)O)s2)cc1OC] |

| Example | |
|---|---|
| 1-45 | 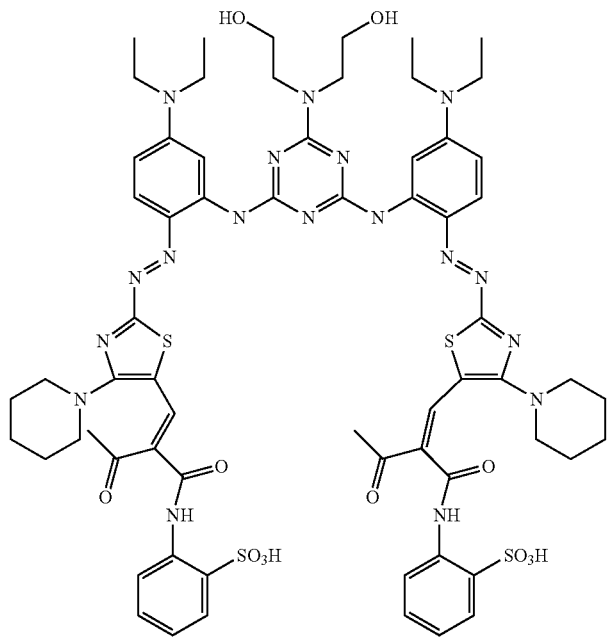 [SMILES: CCN(CC)c1ccc(/N=N/c2nc(N3CCCCC3)c(/C=C(/C(C)=O)C(=O)Nc3ccccc3S(=O)(=O)O)s2)c(Nc2nc(Nc3cc(N(CC)CC)ccc3/N=N/c3nc(N4CCCCC4)c(/C=C(\C(C)=O)C(=O)Nc4ccccc4S(=O)(=O)O)s3)nc(N(CCO)CCO)n2)c1] |
| 1-46 | 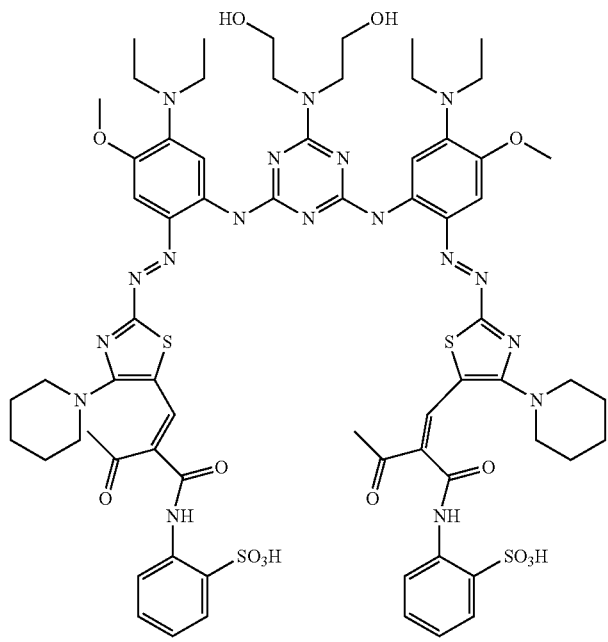 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccccc4S(=O)(=O)O)s3)nc(N(CCO)CCO)n2)c(/N=N/c2nc(N3CCCCC3)c(/C=C(/C(C)=O)C(=O)Nc3ccccc3S(=O)(=O)O)s2)cc1OC] |

-continued
| Example | |
|---|---|
| 1-47 | 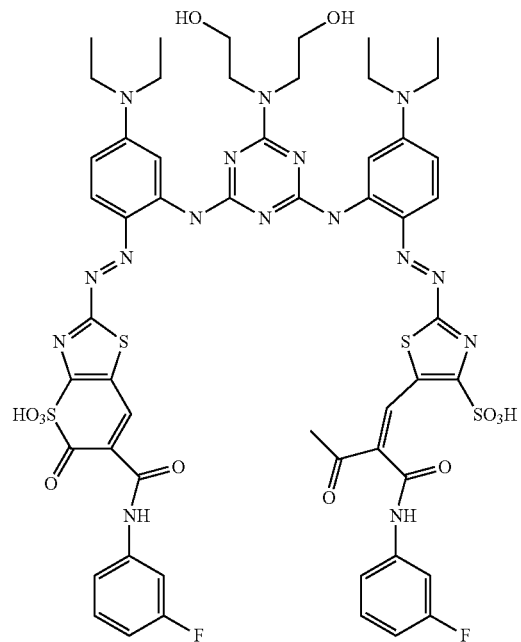 |
| 1-48 | 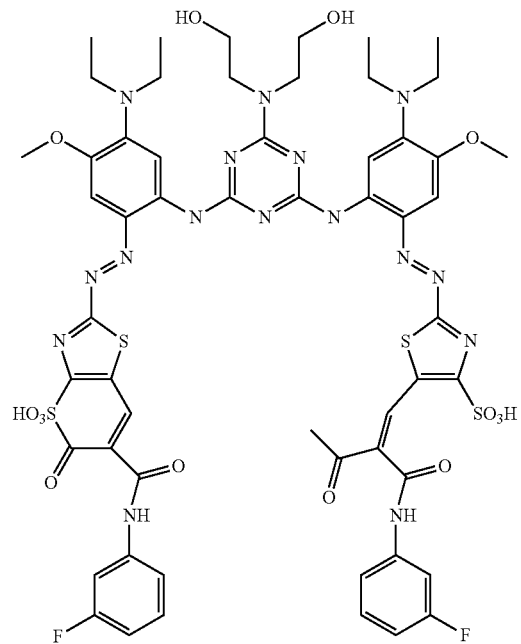 |

| Example | |
|---|---|
| 1-49 | 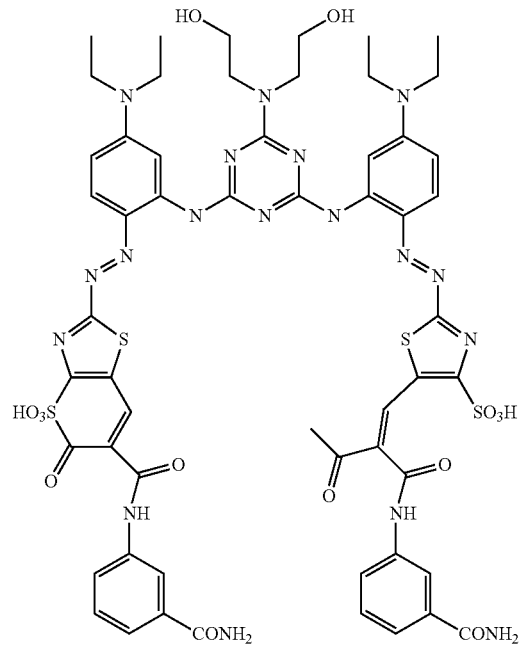 |
| 1-50 | 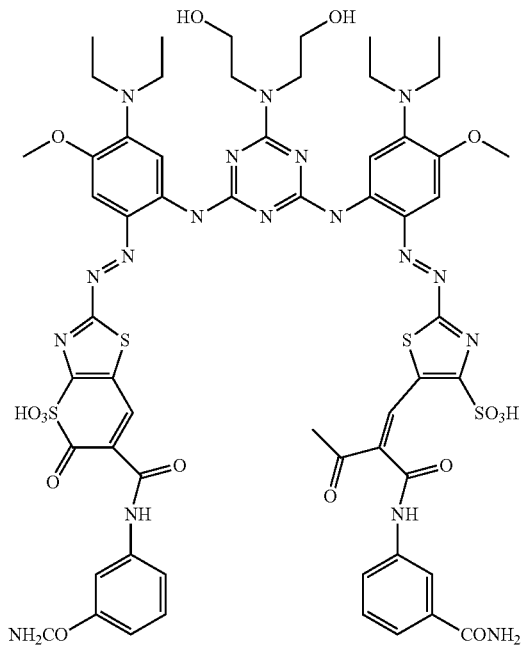 |

| Example | |
|---|---|
| 1-51 | 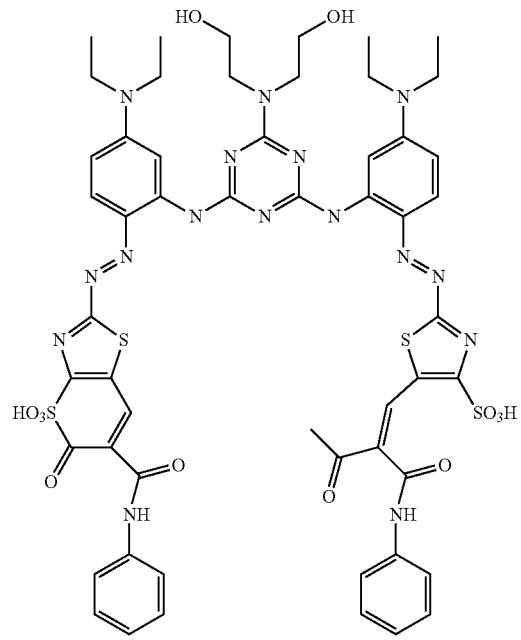 |
| 1-52 | 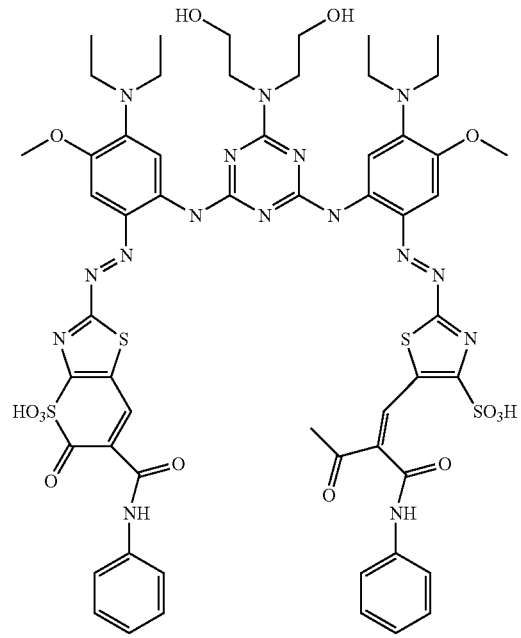 |

| Example | |
|---|---|
| 1-53 | 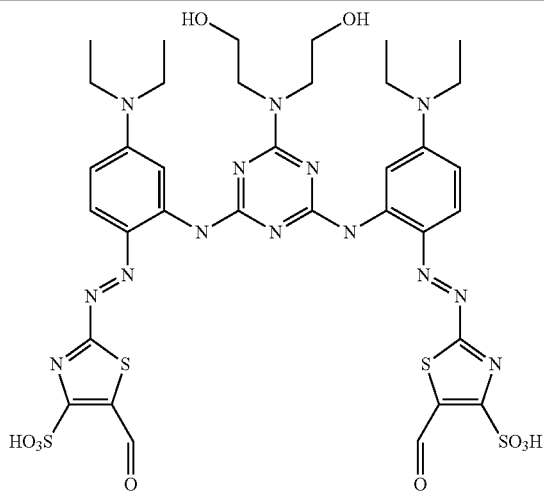 [SMILES: CCN(CC)c1ccc(/N=N/c2nc(S(=O)(=O)O)c(C=O)s2)c(Nc2nc(Nc3cc(N(CC)CC)ccc3/N=N/c3nc(S(=O)(=O)O)c(C=O)s3)nc(N(CCO)CCO)n2)c1] |
| 1-54 | 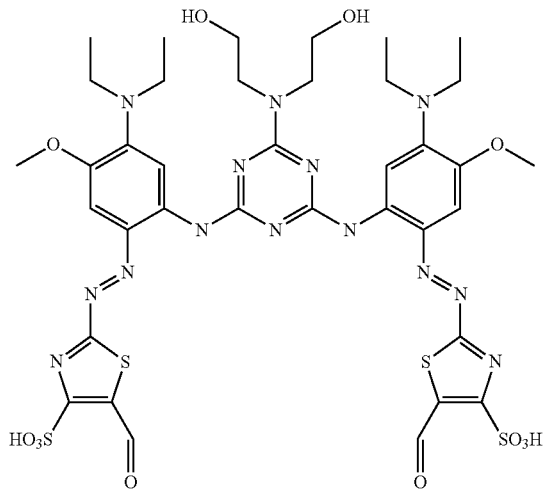 |
| 1-55 | 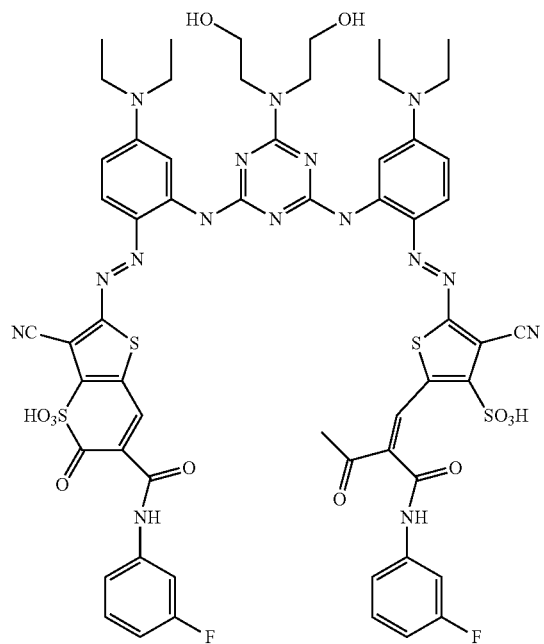 |

| Example | |
|---|---|
| 1-56 | 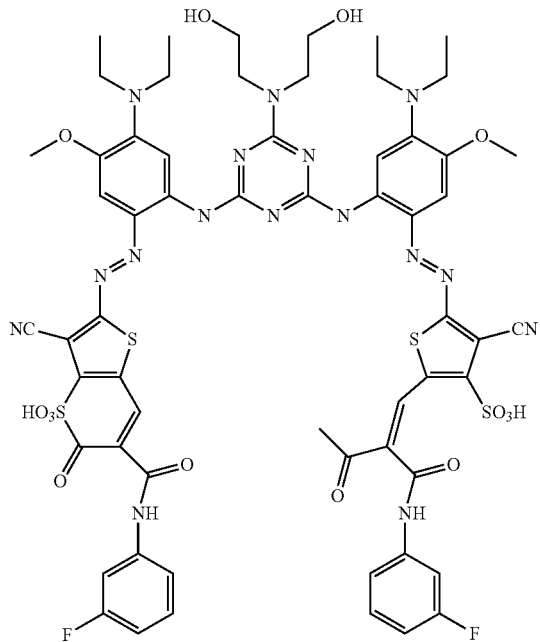 |
| 1-57 | 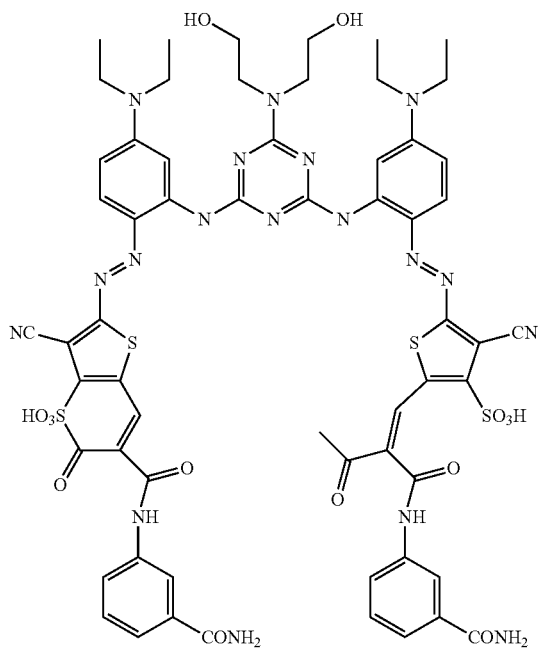 |

| Example | |
|---|---|
| 1-58 | 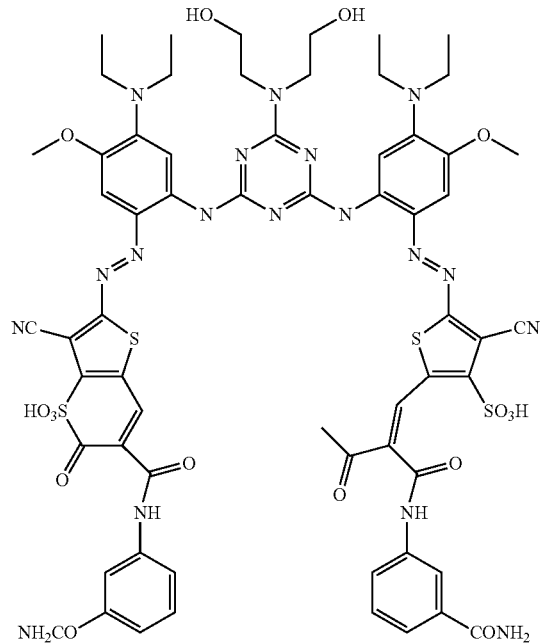 |
| 1-59 | 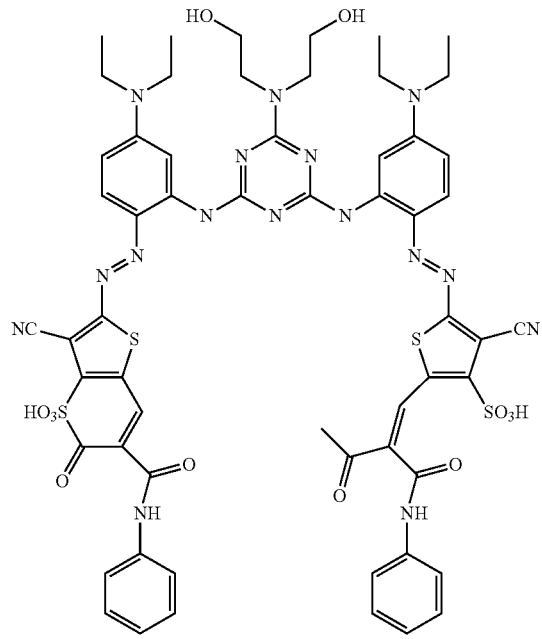 |

| Example | |
|---|---|
| 1-60 | 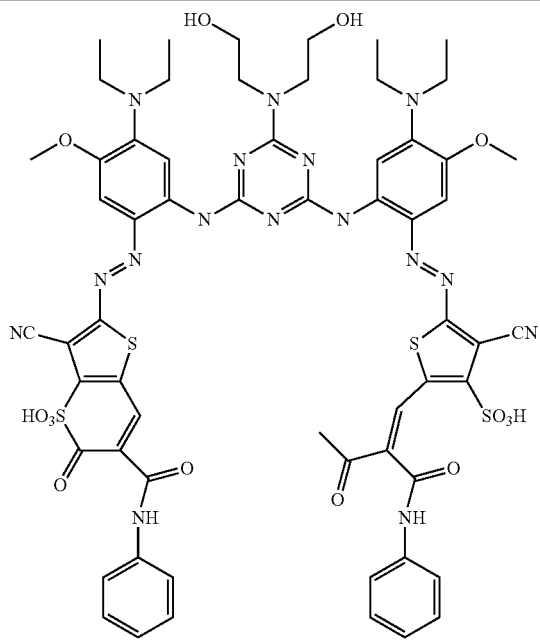 |
| 1-61 | 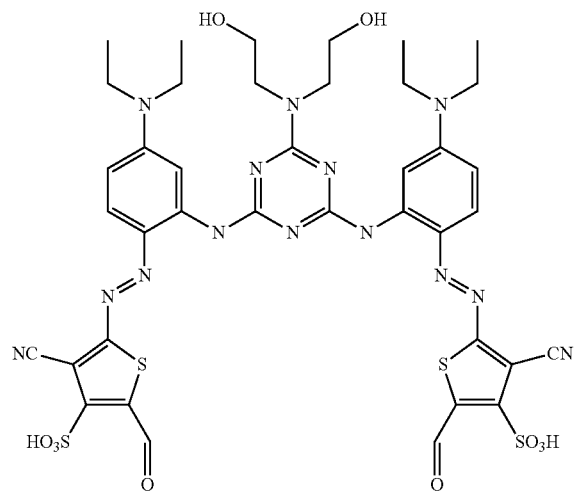 [SMILES: CCN(CC)c1ccc(/N=N/c2sc(C=O)c(S(=O)(=O)O)c2C#N)c(Nc2nc(Nc3cc(N(CC)CC)ccc3/N=N/c3sc(C=O)c(S(=O)(=O)O)c3C#N)nc(N(CCO)CCO)n2)c1] |
| 1-62 | 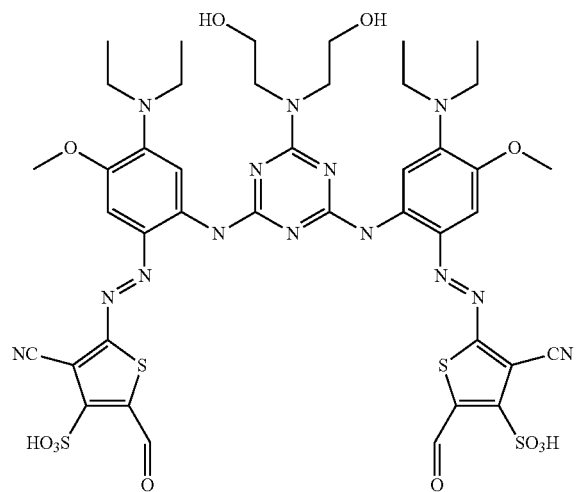 [SMILES: CCN(CC)c1cc(Nc2nc(Nc3cc(N(CC)CC)c(OC)cc3/N=N/c3sc(C=O)c(S(=O)(=O)O)c3C#N)nc(N(CCO)CCO)n2)c(/N=N/c2sc(C=O)c(S(=O)(=O)O)c2C#N)cc1OC] |

| Example | |
|---|---|
| 1-63 | 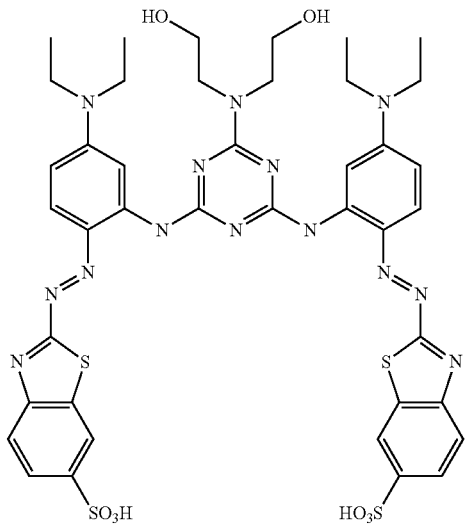 [SMILES: CCN(CC)c1ccc(/N=N/c2nc3ccc(S(=O)(=O)O)cc3s2)c(Nc2nc(Nc3cc(N(CC)CC)ccc3/N=N/c3nc4ccc(S(=O)(=O)O)cc4s3)nc(N(CCO)CCO)n2)c1] |
| 1-64 | 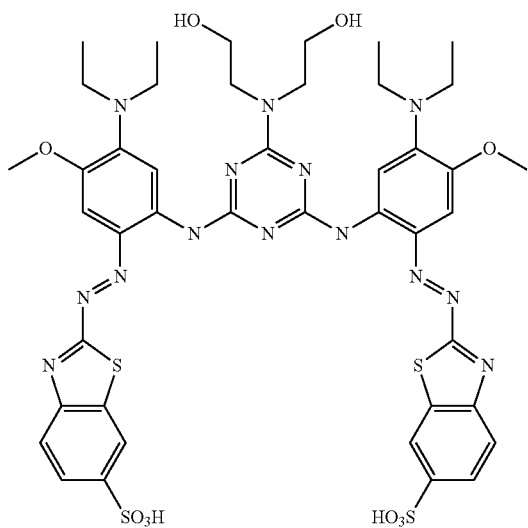 |
| 1-65 | 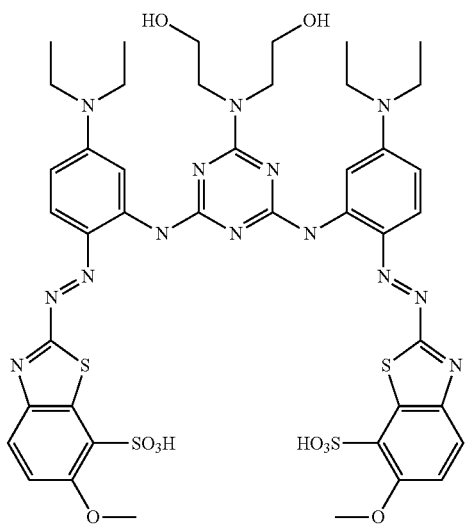 [SMILES: CCN(CC)c1ccc(/N=N/c2nc3ccc(OC)c(S(=O)(=O)O)c3s2)c(Nc2nc(Nc3cc(N(CC)CC)ccc3/N=N/c3nc4ccc(OC)c(S(=O)(=O)O)c4s3)nc(N(CCO)CCO)n2)c1] |

| Example | |
|---|---|
| 1-66 | 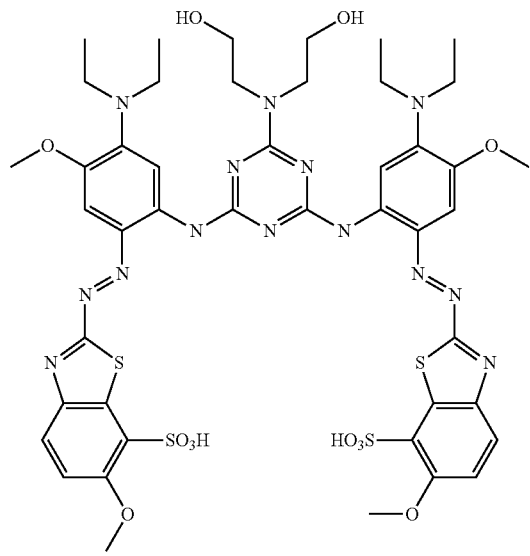 |
| 1-67 | 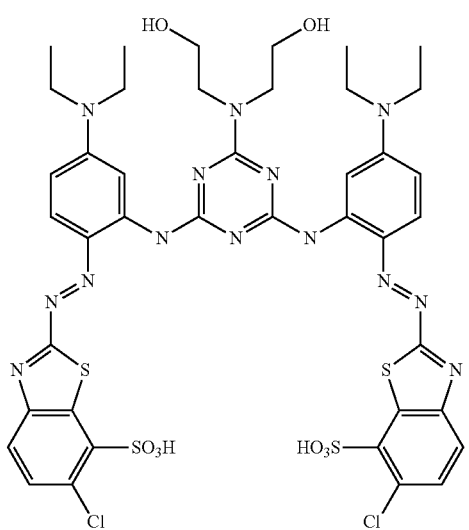 |
| 1-68 | 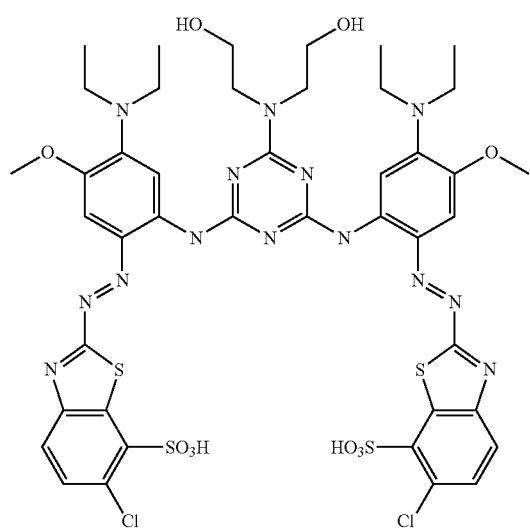 |

-continued
| Example | |
|---|---|
| 1-69 | 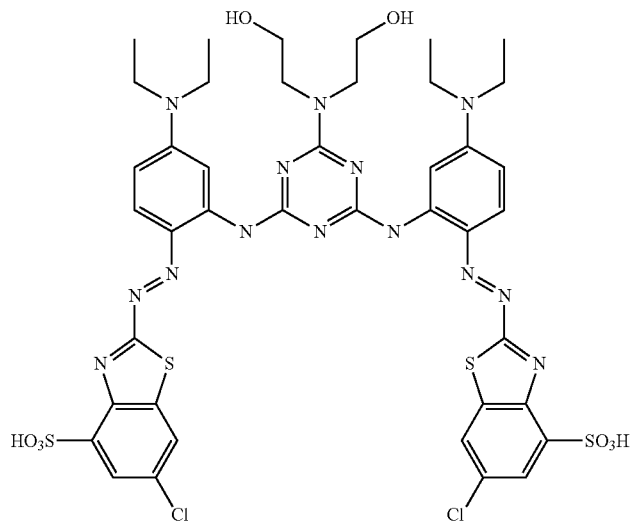 [SMILES: CCN(CC)c1ccc(/N=N/c2nc3c(S(=O)(=O)O)cc(Cl)cc3s2)c(Nc2nc(Nc3cc(N(CC)CC)ccc3/N=N/c3nc4c(S(=O)(=O)O)cc(Cl)cc4s3)nc(N(CCO)CCO)n2)c1] |
| 1-70 | 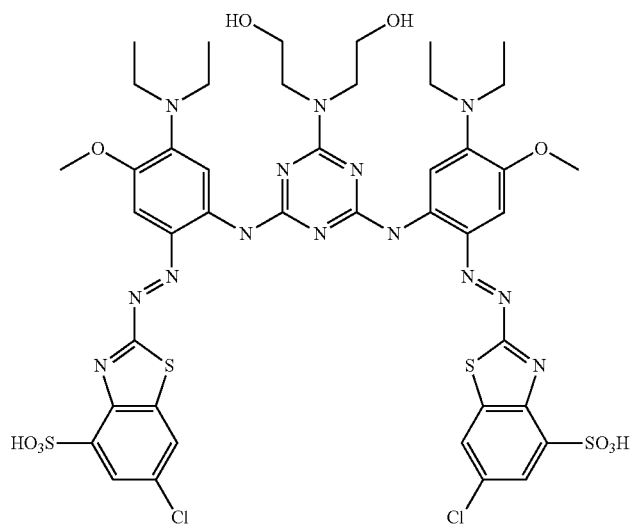 [SMILES: CCN(CC)c1cc(Nc2nc(Nc3cc(N(CC)CC)c(OC)cc3/N=N/c3nc4c(S(=O)(=O)O)cc(Cl)cc4s3)nc(N(CCO)CCO)n2)c(/N=N/c2nc3c(S(=O)(=O)O)cc(Cl)cc3s2)cc1OC] |
| 1-71 | 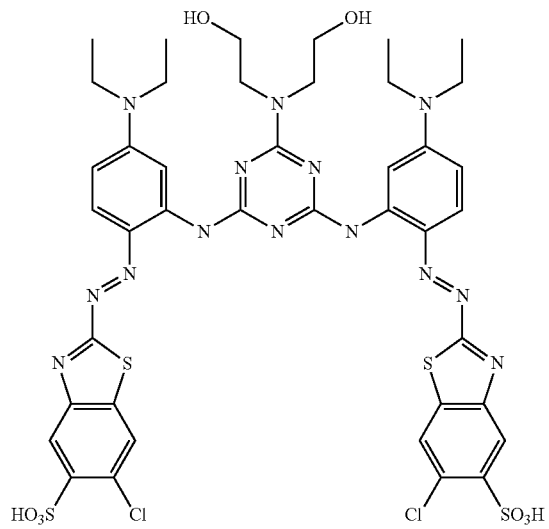 [SMILES: CCN(CC)c1ccc(/N=N/c2nc3cc(S(=O)(=O)O)c(Cl)cc3s2)c(Nc2nc(Nc3cc(N(CC)CC)ccc3/N=N/c3nc4cc(S(=O)(=O)O)c(Cl)cc4s3)nc(N(CCO)CCO)n2)c1] |

| Example | |
|---|---|
| 1-72 | 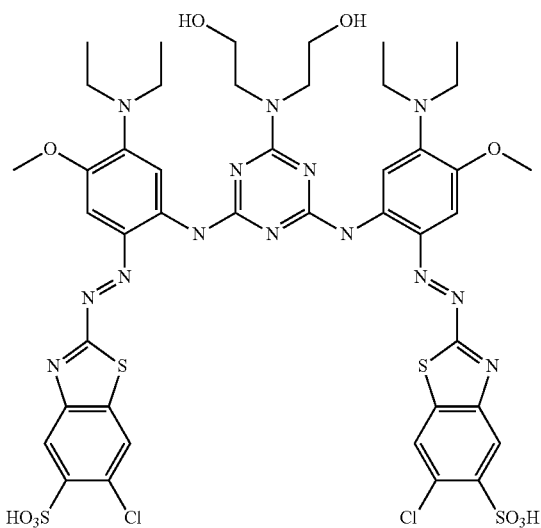 |
| 1-73 | 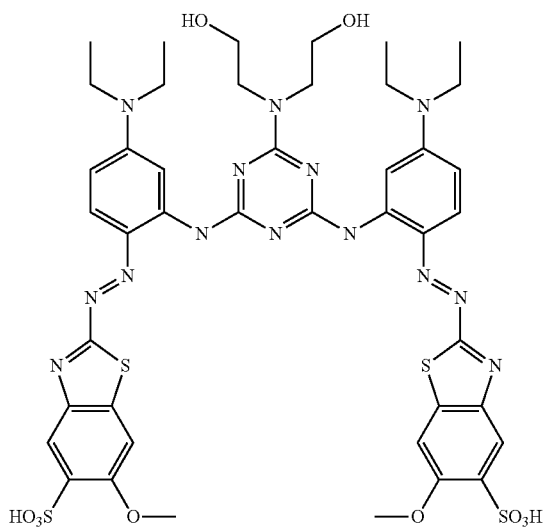 |
| 1-74 | 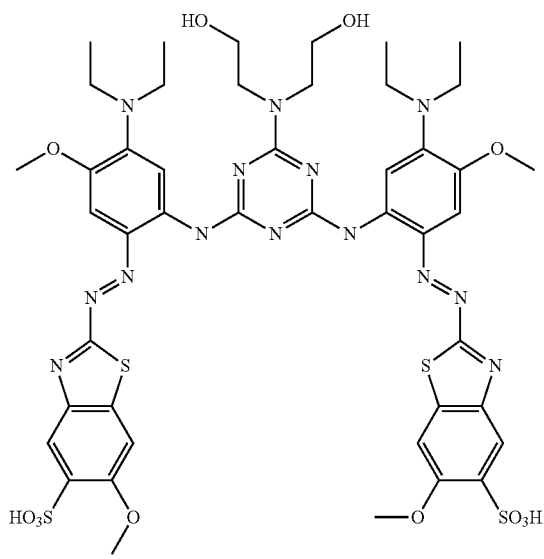 |

| Example | |
|---|---|
| 1-75 | 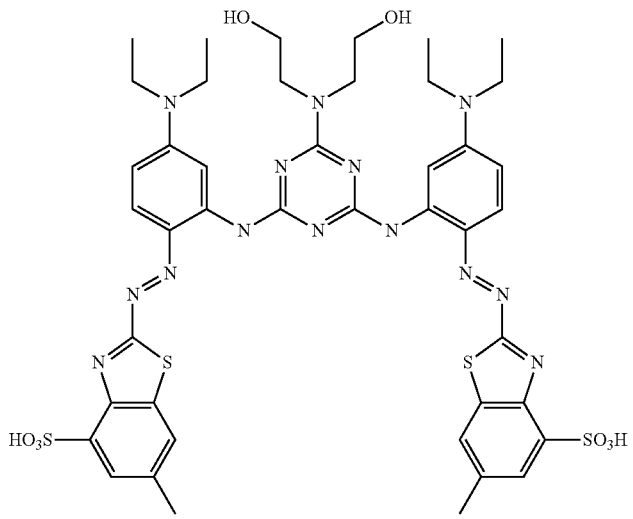 [SMILES: CCN(CC)c1ccc(/N=N/c2nc3c(S(=O)(=O)O)cc(C)cc3s2)c(Nc2nc(Nc3cc(N(CC)CC)ccc3/N=N/c3nc4c(S(=O)(=O)O)cc(C)cc4s3)nc(N(CCO)CCO)n2)c1] |
| 1-76 | 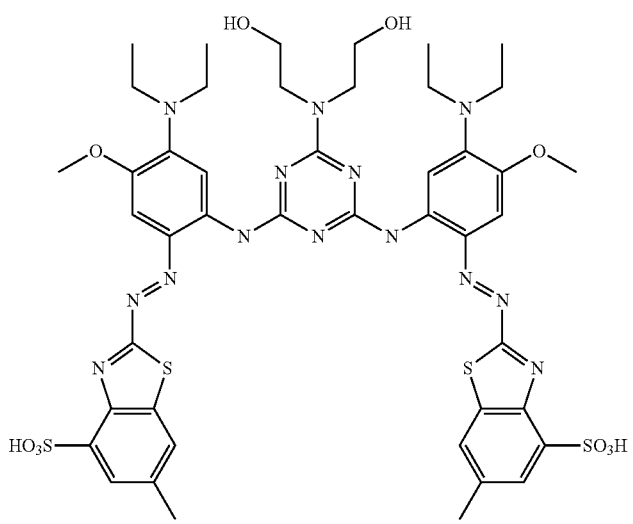 [SMILES: CCN(CC)c1cc(Nc2nc(Nc3cc(N(CC)CC)c(OC)cc3/N=N/c3nc4c(S(=O)(=O)O)cc(C)cc4s3)nc(N(CCO)CCO)n2)c(/N=N/c2nc3c(S(=O)(=O)O)cc(C)cc3s2)cc1OC] |
| 1-77 | 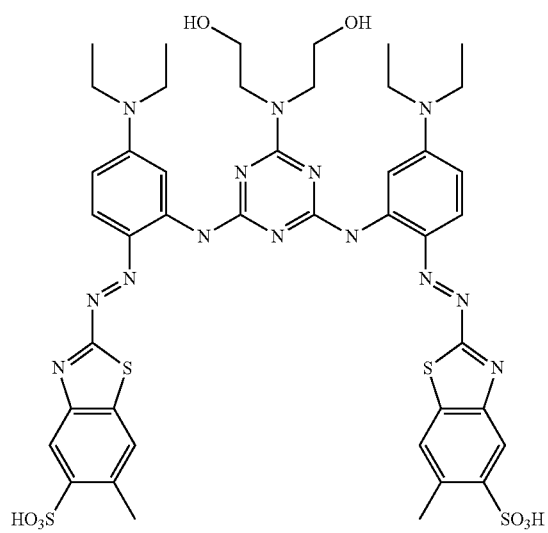 |

| Example | |
|---|---|
| 1-78 | 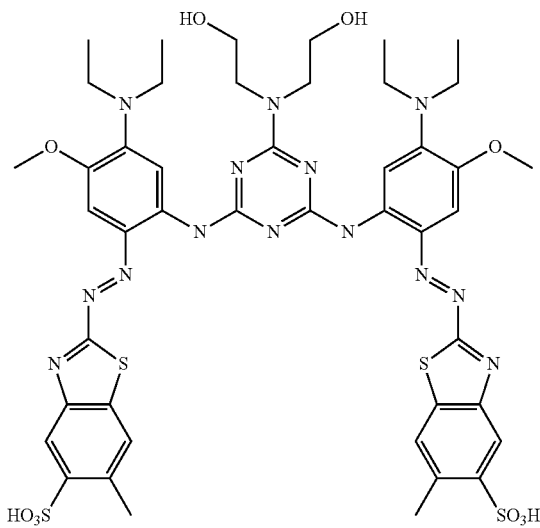 |
| 1-79 | 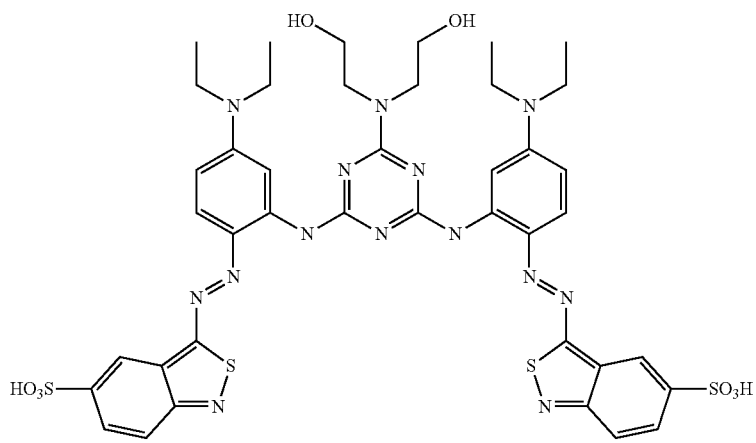 [SMILES: CCN(CC)c1ccc(/N=N/c2snc3ccc(S(=O)(=O)O)cc23)c(Nc2nc(Nc3cc(N(CC)CC)ccc3/N=N/c3snc4ccc(S(=O)(=O)O)cc34)nc(N(CCO)CCO)n2)c1] |
| 1-80 | 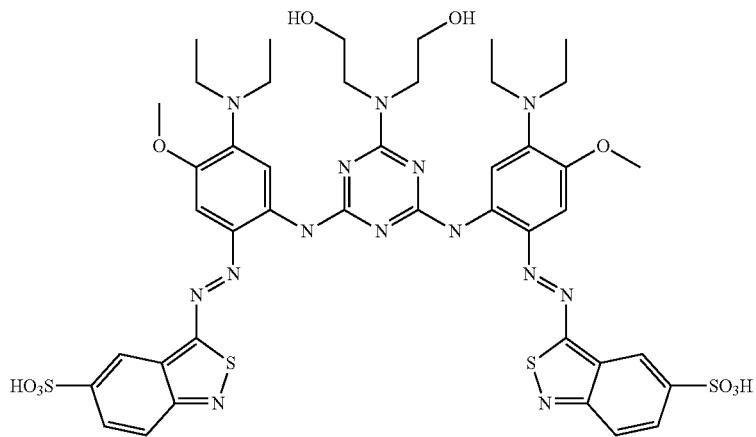 [SMILES: CCN(CC)c1cc(Nc2nc(Nc3cc(N(CC)CC)c(OC)cc3/N=N/c3snc4ccc(S(=O)(=O)O)cc34)nc(N(CCO)CCO)n2)c(/N=N/c2snc3ccc(S(=O)(=O)O)cc23)cc1OC] |

-continued
| Example | |
|---|---|
| 1-81 | 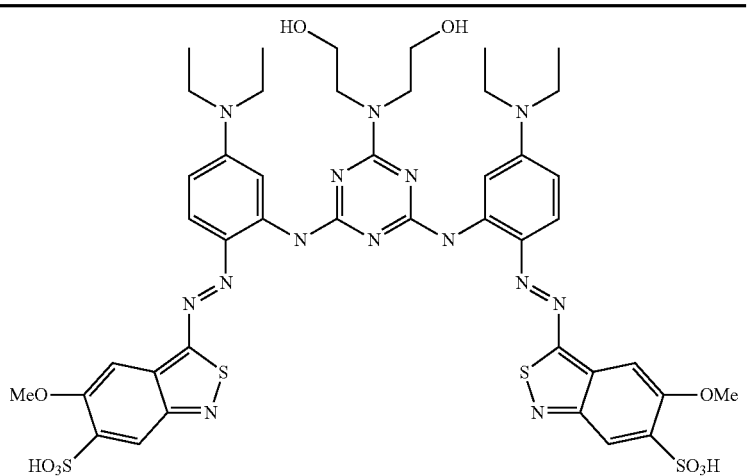 |
| 1-82 | 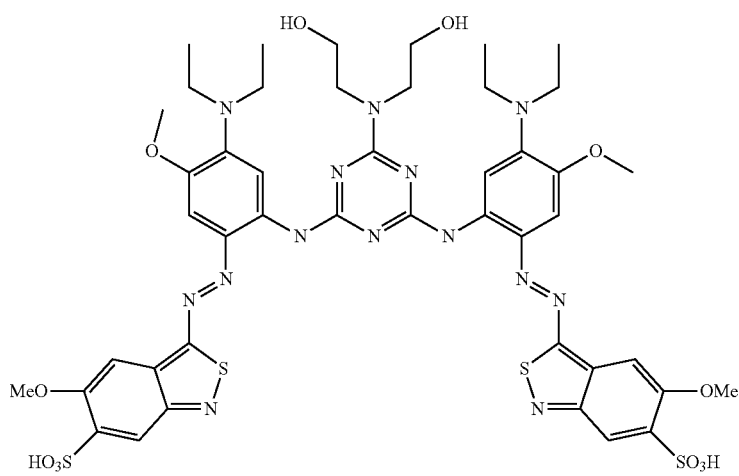 [SMILES: CCN(CC)c1cc(Nc2nc(Nc3cc(N(CC)CC)c(OC)cc3/N=N/c3snc4cc(S(=O)(=O)O)c(OC)cc34)nc(N(CCO)CCO)n2)c(/N=N/c2snc3cc(S(=O)(=O)O)c(OC)cc23)cc1OC] |
| 1-83 | 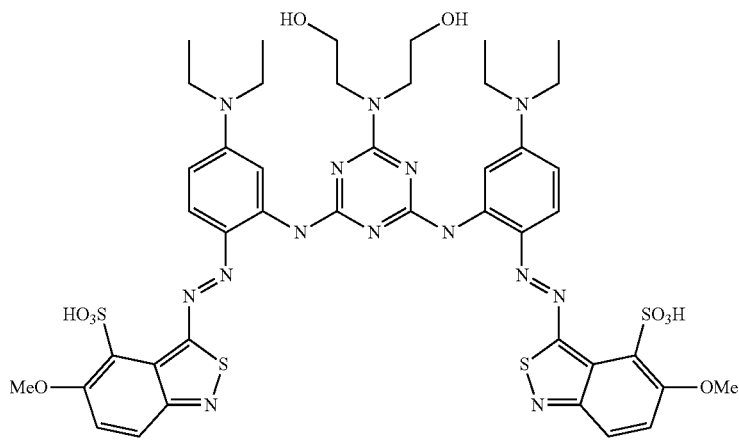 [SMILES: CCN(CC)c1ccc(/N=N/c2snc3ccc(OC)c(S(=O)(=O)O)c23)c(Nc2nc(Nc3cc(N(CC)CC)ccc3/N=N/c3snc4ccc(OC)c(S(=O)(=O)O)c34)nc(N(CCO)CCO)n2)c1] |

| Example | |
|---|---|
| 1-84 | 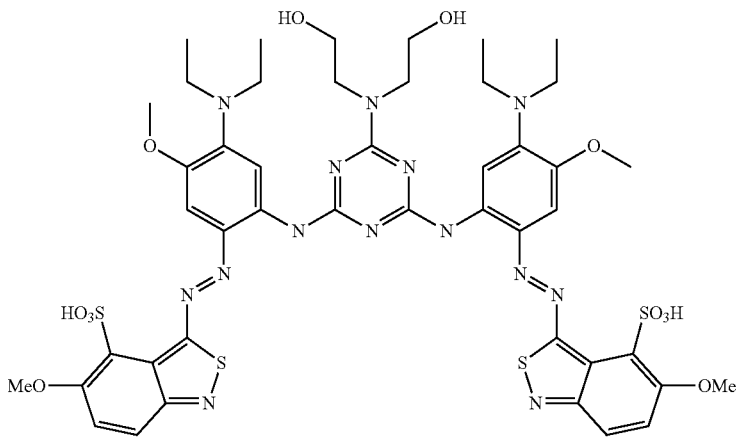 [SMILES: CCN(CC)c1cc(Nc2nc(Nc3cc(N(CC)CC)c(OC)cc3/N=N/c3snc4ccc(OC)c(S(=O)(=O)O)c34)nc(N(CCO)CCO)n2)c(/N=N/c2snc3ccc(OC)c(S(=O)(=O)O)c23)cc1OC] |

The invention claimed is:

1. A dye of the formula (1)

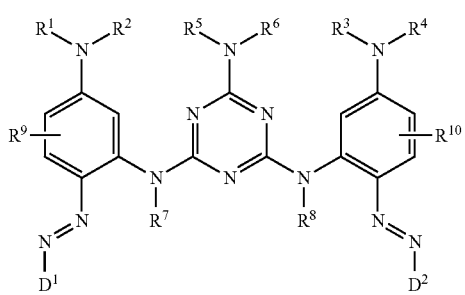

in which each of $R^1$, $R^2$, $R^3$ and $R^4$, independently from one another is hydrogen or $(C_1-C_6)$ alkyl;

each of $R^5$ and $R^6$, independently from one another is hydrogen, $(C_1-C_6)$ alkyl or $(C_1-C_6)$ alkyl substituted by hydroxy;

each of $R^7$ and $R^8$, independently from one another is hydrogen, $(C_1-C_6)$ alkyl or phenyl;

each of $R^9$ and $R^{10}$, independently from one another is hydrogen, $(C_1-C_6)$ alkyl, $(C_1-C_6)$ alkoxy, trifluoromethyl, hydroxy, cyano, nitro, halogen, —NHCHO, —NHCO$(C_1-C_6)$-alkyl, —NHCOaryl, —NHSO$_2(C_1-C_6)$-alkyl or —NHSO$_2$aryl; and each of $D^1$ and $D^2$, independently from one another is the residue of a diazo component, which comprises at least one group —SO$_3$M, wherein M is hydrogen, an alkali metal, ammonium or one equivalent of an alkali earth metal.

2. The dye of the formula (1) according to claim 1, wherein $R^1$ to $R^4$ are identical and are hydrogen or $(C_1-C_4)$ alkyl; $R^5$ and $R^6$ are identical and are hydrogen, $(C_1-C_4)$ alkyl or $(C_1-C_4)$ alkyl substituted by hydroxy; $R^7$ and $R^8$ are identical and are hydrogen, methyl or ethyl; and $R^9$ and $R^{10}$ are identical and are hydrogen, methyl, or ethyl.

3. The dye of the formula (1) according to claim 1, which has the formula (1a)

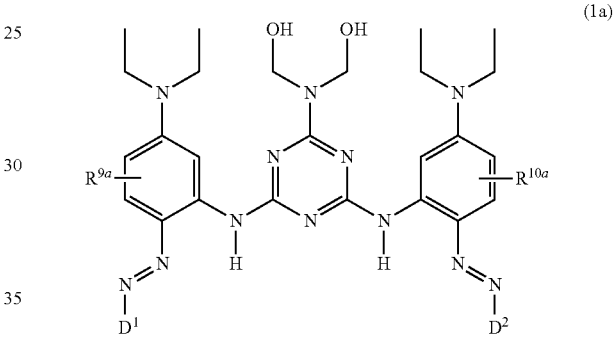

in which $R^{9a}$ and $R^{10a}$ are identical and are hydrogen or methoxy; and $D^1$ and $D^2$ are defined as given in claim 1.

4. The dye of the formula (1) according to claim 1, in which each of $D^1$ and $D^2$, independently of one another denotes a group of the formula (I)

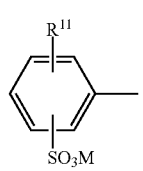

where $R^{11}$ is hydrogen, $(C_1-C_4)$-alkyl, $(C_1-C_4)$-alkoxy, trifluoromethyl or halogen; and M is hydrogen, an alkali metal, ammonium or one equivalent of an alkali earth metal; or each of $D^1$ and $D^2$, independently of one another denotes a group of the formula (II)

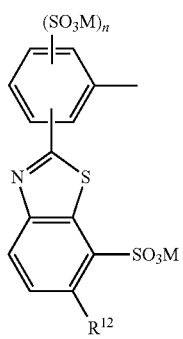
(II)

where $R^{12}$ is hydrogen or $(C_1-C_4)$-alkyl;
n is 0 or 1; and
M is defined as given above;
or
each of $D^1$ and $D^2$, independently of one another denotes a group of the formula (III)

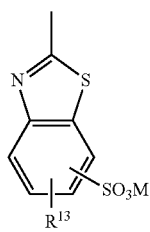
(III)

where
$R^{13}$ is hydrogen, $(C_1-C_4)$-alkyl, $(C_1-C_4)$-alkoxy or halogen; and
M is defined as given above;
or
each of $D^1$ and $D^2$, independently of one another denotes a group of the formula (IV)

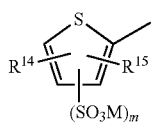
(IV)

where
$R^{14}$ is hydrogen, cyano
$R^{15}$ is hydrogen, —CHO or a group of the formula (a)

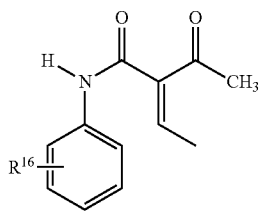
(a)

wherein $R^{16}$ is hydrogen, halogen or —CONH$_2$;
m is 0 or 1; and
M is defined as given above;

or
each of $D^1$ and $D^2$ denotes a group of the formula (V)

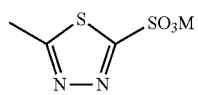
(V)

M is defined as given above; or
each of $D^1$ and $D^2$ denotes a group of the formula (VI)

(VI)

where $R^{17}$ is —SO$_3$M, —CHO, —CH=C(CN)$_2$, a group of the formula (a) as defined above or a group of the formula (b)

(b)

$R^{18}$ is —SO$_3$M, $(C_1-C_4)$-alkyl, sulfophenyl-$(C_1-C_4)$-alkylamino, morpholino or piperidino;
and M is defined as given above;
or
each of $D^1$ and $D^2$, independently of one another denotes a group of the formula (VII)

(VII)

where
$R^{19}$ is hydrogen, $(C_1-C_4)$-alkyl, $(C_1-C_4)$-alkoxy or halogen, and
M is defined as given above.

5. The dye of the formula (1) according to claim 4, in which $D^1$ and $D^2$ are identical and denote one of the groups (I) to (VI) as defined in claim 4.

6. A process for the preparation of the dye of the formula (1) according to claim 1 which comprises diazotization of the compounds of the formulae (2) and (3)

$D^1$-NH$_2$ (2)

$D^2$-NH$_2$ (3)

wherein $D^1$ and $D^2$ are defined as given in claim 1, and reacting it with a compound of the formula (4)

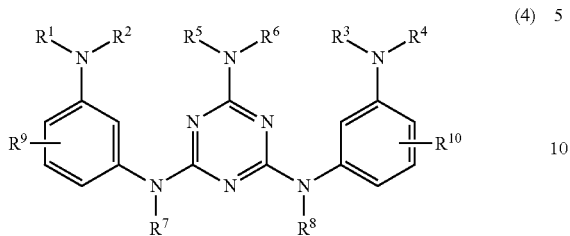

(4)

wherein $R^1$ to $R^{10}$ are defined as given in claim 1.

7. A process for dyeing or printing carboxamido- and/or hydroxyl-containing material, which comprises using as colorant a dye of the formula (I) as claimed in claim 1.

8. An ink for digital textile printing by the inkjet process, which comprises a dye of the formula (I) as claimed in claim 1.

* * * * *